United States Patent
Lacy et al.

(10) Patent No.: US 10,544,323 B2
(45) Date of Patent: Jan. 28, 2020

(54) DRY COLOUR SYSTEMS AND METHODS AND EASILY DISPERSIBLE FORMULATIONS FOR USE IN SUCH SYSTEMS AND METHODS

(71) Applicant: DRIKOLOR INC, Mar Vista, CA (US)

(72) Inventors: Rachel D'Arcy Lacy, Auckland (NZ); Nigel Lacy, Auckland (NZ); Kristian Hugh Darcy Slack, New Plymouth (NZ); Jamie Sinclair McLellan, Auckland (NZ); Simon Francis Robert Hinkley, Lower Hutt (NZ); Cameron Tristram, Auckland (NZ)

(73) Assignee: DRIKOLOR INC, Mar Vista, CA (US)

( * ) Notice: Subject to any disclaimer, the term of this patent is extended or adjusted under 35 U.S.C. 154(b) by 387 days.

(21) Appl. No.: 15/257,480

(22) Filed: Sep. 6, 2016

(65) Prior Publication Data

US 2016/0369120 A1   Dec. 22, 2016

Related U.S. Application Data

(63) Continuation-in-part of application No. PCT/NZ2014/000026, filed on Mar. 5, 2014, and a
(Continued)

(30) Foreign Application Priority Data

Mar. 5, 2014   (NZ) ........................................ 622077

(51) Int. Cl.
   *C09D 17/00*   (2006.01)
   *C09B 67/02*   (2006.01)
   *B65D 65/46*   (2006.01)

(52) U.S. Cl.
   CPC ........... *C09D 17/003* (2013.01); *B65D 65/46* (2013.01); *C09B 67/0097* (2013.01)

(58) Field of Classification Search
   CPC ........ C09D 17/00; B01F 13/1069; B01F 3/12; B65D 65/46
(Continued)

(56) References Cited

U.S. PATENT DOCUMENTS 3,259,514 A   7/1966  Wilkinson
3,770,476 A   11/1973  McKay
(Continued)

FOREIGN PATENT DOCUMENTS

EP   1 070 747   1/2001
NZ     207217 A   9/1985
(Continued)

OTHER PUBLICATIONS

Anon (2007) Standard test methods for relative tinting strength of paste-type printing ink dispersions (D2006-07) ASTM International, 100 Bar Harbor Drive, PO Box C 700, West Conshohocken, PA 19428-2959, United States.
(Continued)

*Primary Examiner* — King M Chu
(74) *Attorney, Agent, or Firm* — Nixon & Vanderhye PC

(57) ABSTRACT

A dry pigment paint system includes dry pigment doses that may be used alone or combined with other dry pigment doses to provide a desired color when dispersed in a paint base. The system may use a plurality of dry pigment formulations, with each dry pigment formulation consisting of one or more dry pigments, generally a plurality of dry pigments. Each dry pigment dose may include a single dry pigment formulation. Each dose may be a tablet, capsule or sachet. Various dose forms and dispensing systems are disclosed. Formulations of easily dispersible (ED) pigments comprising a combination of a carboxylic acid polymer and a non-ionic alkoxylated surfactant are also disclosed. The combination is used in the formulation of a plurality of pigments. The formulations are suitable for mixing with a base medium at the point-of-sale (PoS) or by the end user.

5 Claims, 15 Drawing Sheets

Related U.S. Application Data continuation-in-part of application No. 14/840,871, filed on Aug. 31, 2015, now Pat. No. 9,441,137, which is a continuation-in-part of application No. 14/639,207, filed on Mar. 5, 2015, now Pat. No. 9,120,950.

(58) Field of Classification Search
USPC .......................................................... 106/400
See application file for complete search history.

(56) References Cited

U.S. PATENT DOCUMENTS

| | | |
|---|---|---|
| 7,134,573 B2 | 11/2006 | Post |
| 7,198,668 B2 | 4/2007 | Reisacher et al. |
| 7,311,223 B2 | 12/2007 | Post |
| 7,459,017 B2 | 12/2008 | Ortalano et al. |
| 7,833,343 B2 | 11/2010 | Plueg et al. |
| 7,834,098 B2 | 11/2010 | Wenning et al. |
| 7,842,757 B2 | 11/2010 | Roy et al. |
| 7,846,997 B2 | 12/2010 | Kruithof et al. |
| 2007/0221531 A1 | 9/2007 | Coughlin |
| 2007/0266901 A1 | 11/2007 | Rance et al. |
| 2008/0060553 A1* | 3/2008 | Guttler ................ C09B 67/0097 106/400 |
| 2008/0190319 A1 | 8/2008 | Reisacher et al. |
| 2010/0180794 A1 | 7/2010 | Tauber et al. |

FOREIGN PATENT DOCUMENTS

| | | |
|---|---|---|
| WO | WO 2007/115335 | 10/2007 |
| WO | WO 2009/132293 | 10/2009 |
| WO | WO 2014/137226 | 9/2014 |

OTHER PUBLICATIONS

Anon (2010) Standard test method for fineness of dispersion of pigment-vehicle systems by Hegman-type gage (D1210-05) ASTM International, 100 Bar Harbor Drive, PO Box C 700, West Conshohocken, PA 19428-2959, United States.

* cited by examiner

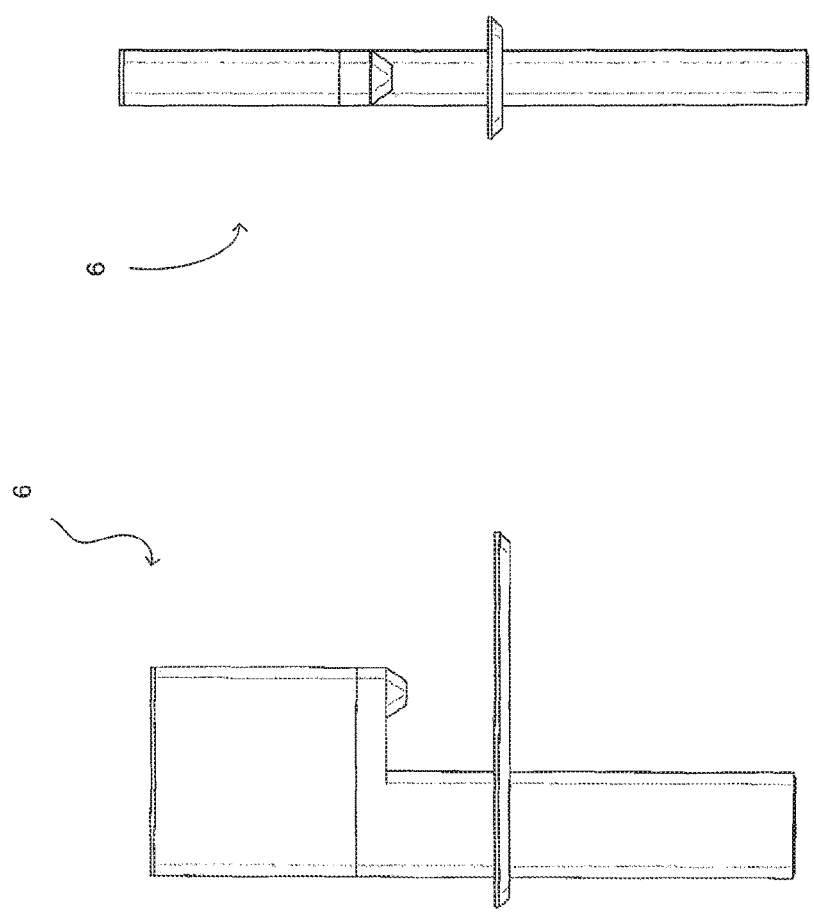

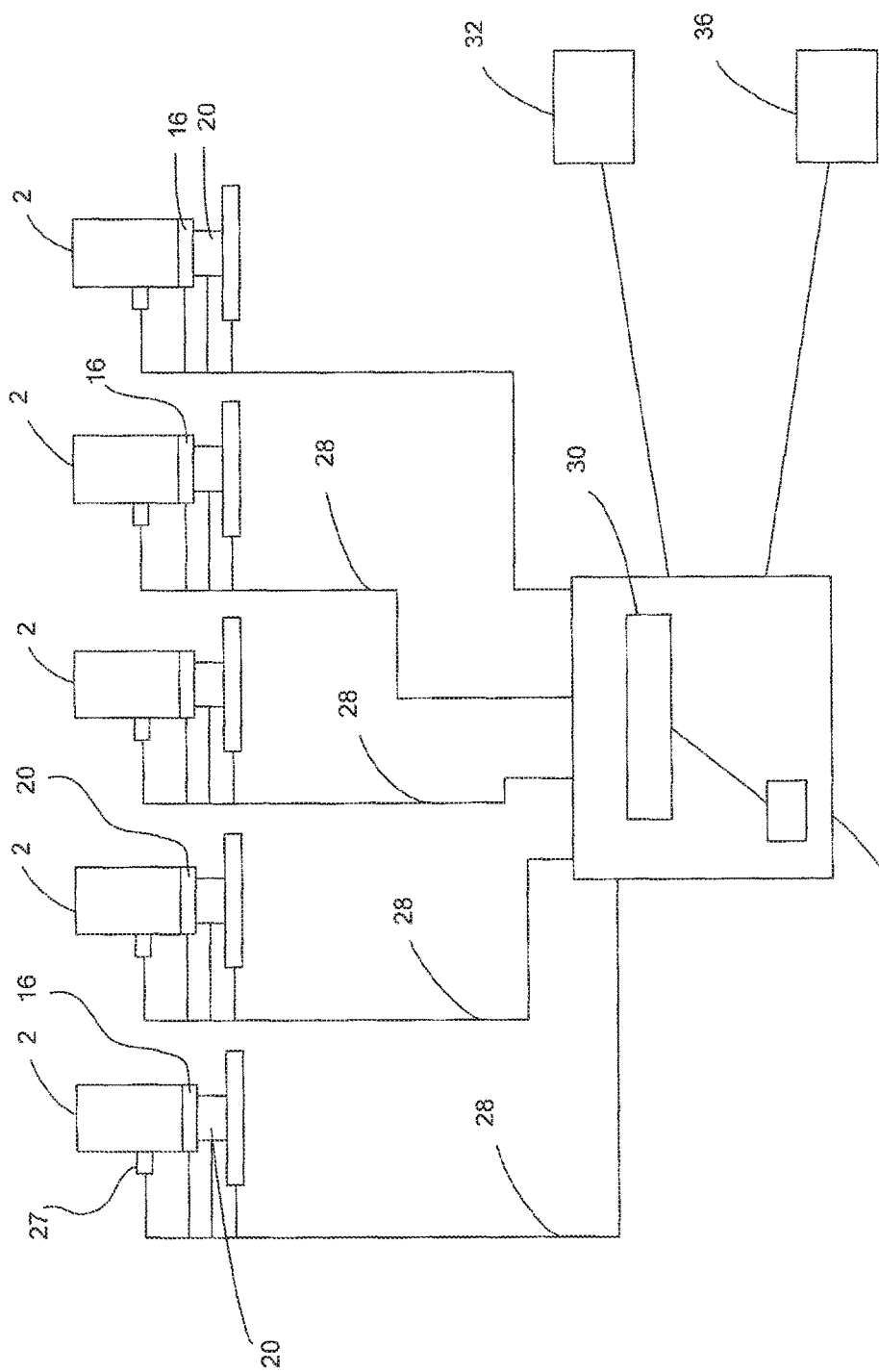

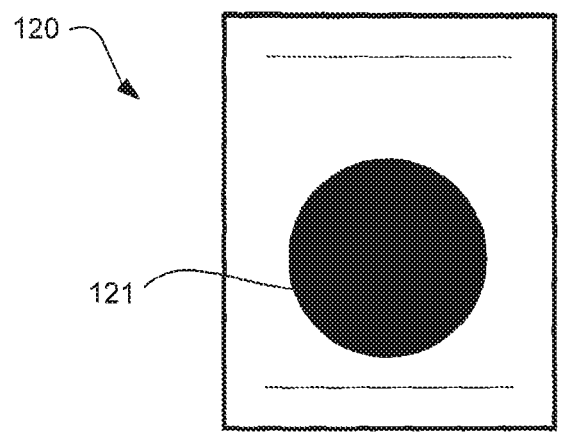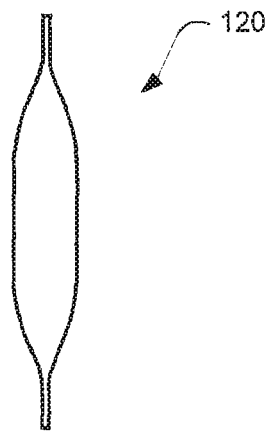
Figure 15   Figure 15A
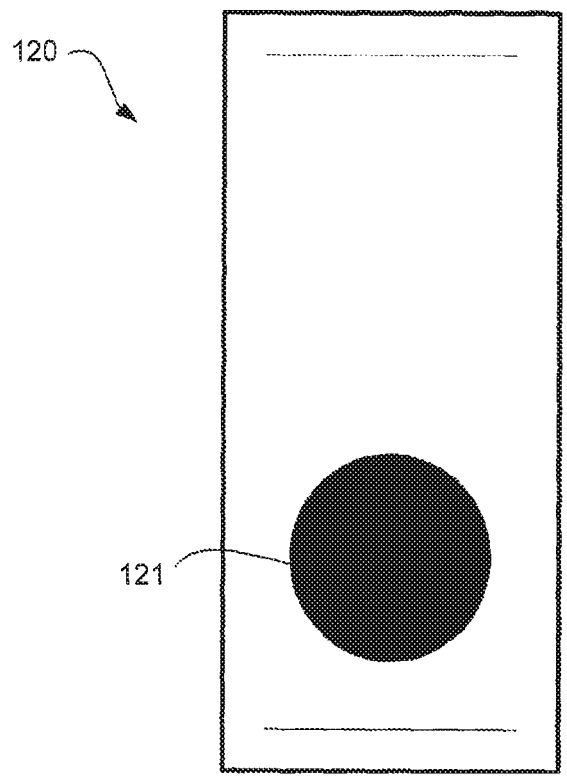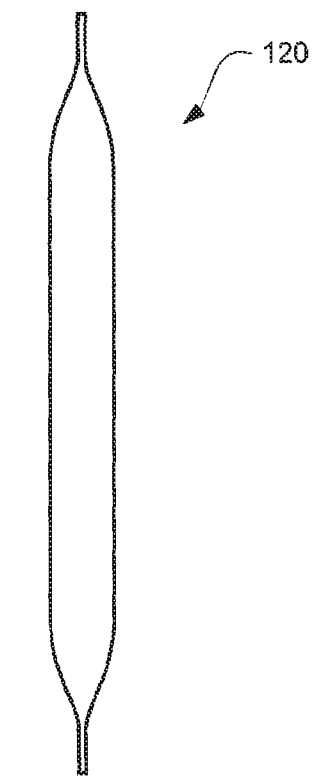
Figure 16   Figure 16A

DRY COLOUR SYSTEMS AND METHODS AND EASILY DISPERSIBLE FORMULATIONS FOR USE IN SUCH SYSTEMS AND METHODS

This application is a CIP Application of PCT/NZ2014/000026, filed Mar. 5, 2014, and a CIP of Application No. 14/840,871 filed Aug. 31, 2015 (now U.S. Pat. No. 9,441,137), which is a CIP of Application No. 14/639,207 filed Mar. 5, 2015 (now U.S. Pat. No. 9,120,950), which claims priority to NZ Application No. 622077 filed Mar. 5, 2014, the contents of each of which are hereby incorporated by reference.

FIELD OF THE INVENTION

The invention relates to the colouring of base media such as paint using dry pigment formulations particularly, but not exclusively, at the point of sale or point of use and related methods and systems. The invention also relates to a combination of formulants capable of effectively dispersing a range of pigments in a base medium, methods for the preparation of formulations using the combination of formulants and the use of these formulations in colouring a base medium. In particular, the invention relates to doses of formulations of easily dispersible (ED) "whole colour" suitable for mixing with a base medium at the point of sale or by the end user. An example of a suitable base medium is acrylate paint.

BACKGROUND TO THE INVENTION

A number of methods have been devised to apply colour or tints to paint. Typically, multiple pigments are separately added to a paint base at either a central location by the paint manufacturer or at the point of sale by a paint retailer to achieve a predetermined paint colour. Both of these approaches have significant limitations.

In the central production model the range of colours is typically limited due to economies of scale, meaning there is little scope for bespoke or low-volume colour production, and logistics of stock holding and transport of the factory-coloured paint limits the practical delivery of a full colour range.

Retail-tinted paint systems rely on human control or a mix of computer control and human programming to accurately tint paints from a low number of separate, single liquid pigments. Each pigment has to be carefully dosed volumetrically by a complex machine in the retail environment by semi-skilled operators according to a formulation provided by the pigment manufacturer, posing a risk of mis-tinting. Further, liquid pigments typically utilise Volatile Organic Compounds (VOCs), have a propensity to dry and clog the dosing machine, and require mechanical mixing in-store.

A further disadvantage of both central production and retail colouring is limited access to design-led colour palettes and the need to engage with the physical paint retail channel.

Dry pigment formulation systems have been developed for paint that can be easily dispersed using minimal mechanical intervention. These pigments are called Easily Dispersed or ED pigments and have been successfully used in the central production of paints and the tinting of concrete at the point of use. The opportunity to use ED pigments at the point of sale of paint, has been identified and a number of systems for formulating mixtures of ED pigments at the point of sale have been explored. For example, U.S. Pat. Nos. 7,311,223 and 7,134,573 describe systems for point of sale dispensing of dry pigment formulations. As ED pigments are particularly concentrated they require very accurate formulation (weighing) which has resulted in proposed retail machines that require very high levels of accuracy and calibration. However, in practice these systems have been impractical and further compromised the quality of the tinted paint, suffering from the same accuracy and user skill problems as do point of sale systems for dispensing liquid formulations. Further, the range of ED pigments is limited, further limiting the potential of retail systems.

As an alternative to incumbent processes, packaging of pigments, including ED pigments, for small volume paint requirements has been proposed. U.S. Patent Publication US 2007/0221531 discloses dissolvable packets containing a predefined quantity of dry powder dispersible pigments that, when added to a predetermined volume of a compatible liquid coating, dissolves in the container to tint the coating. U.S. Patent Publication US 2007/0266901 discloses encapsulated formulations provided as a system and kit, wherein the encapsulating layer is in the form of a sealed pouch that contains the tinting material. Multiple pouches, each having different tinting materials, may be combined to provide a colour range of up to about 150 different colours or shades. The pouches are packaged in a moisture resistant package or container. U.S. Patent Publication US 2003/0060553 discloses pressing single pigment preparations to form dispersible single pigment preparations in the form of pellets or tablets. Pigment portions are marketed in different portion amounts, providing more or less intensive base colours, which may then be mixed with other pigments.

A limitation on the use of commercially-available ED pigments is the limited colour range available in this format. Further, where sold as a final pigment mixture, the different ED dry pigment formulations are mixed in the carrier (pouch/pack/tablet), which does not produce a colour indicative of the final paint colour, making the package less attractive/suitable for display and unsuitable for visual matching or checking with a required colour, prior to mixing into the paint.

NZ207217 proposes a solid paint concentrate including a pigment or mixture of pigments. A final paint colour may be reached by selecting a number of pigment concentrates corresponding to the desired colour. While overcoming some of the limitations of existing systems through the use of a solid, pre-manufactured paint concentrate the prior art tablet systems do not overcome the limitations of the retail environment with respect to mis-tinting risk. Further, the tablet formulations disclosed in the prior art do not disperse effectively without the use of a retail mechanical mixer, thus limiting the sale of colour outside the paint retail channel.

In addition to the limitations of the formulations, methods and systems discussed above, the cost of pigments can be a substantial portion of the total cost of raw materials used in the manufacture of coloured media, including surface coatings such as paints. Individual pigments are processed and formulated in order to optimise their performance when added to a specific base medium. The sought after performance characteristics of these pigment preparations include stability during storage, rapid and uniform dispersibility on mixing with the base medium, and long-term maintenance of the appearance of the coloured medium, e.g. resistance to fading. The art is replete with methods of processing and formulating pigments where the objective is to optimise the performance of a single class of pigment. Examples include the methods disclosed in the publications of Aoba et al (2001), McKay (1973), Thomspon et al (2009) and Wilkinson (1966).

The publication of Aoba et al (2001) discloses a composite pigment of a blueish-green colour. The composite pigment comprises copper phthalocyanine and aluminium phthalocyanine. The composite is prepared by kneading a mixture of the independently comminuted pigments and resin so as to disperse the pigments in the resin. The publication of McKay (1973) discloses flocculation resistant phthalocyanine pigments. The pigments are prepared by milling a combination of a phthalocyanine pigment, a chloromethylated phthalocyanine compound and organic amines. Cyclohexylamines and n-butylamine are discloses as examples of organic amines used in the preparation of the pigments. The publication of Thomspon et al (2009) discloses quinacridone products used for colouring a variety of base media including paints. The products are crystal forms of solid solutions of 2,9-dimethyoxyquinacridone and 2,9-dichloroquinacridone. The publication of Wilkinson (1966) discloses solid solutions or mixed crystals in which at least one other component is a thiachromonoacridone. The pigment is provided as a solid solution as opposed to a formulation.

Further processing of such pigment preparations may still be required to ensure a base medium in which the primary particles of the pigment are uniformly dispersed is obtained. Additives may be required during this further processing to prevent excessive foaming and loss of capacity. Where pigment formulations are used to prepare coloured media at the point-of-sale (PoS) the capacity and time for further processing is limited. As noted above, liquid pigment formulations have been used in PoS operations. The primary particles of the pigment may be regarded as being in a partially "pre-dispersed" state in these formulations. A need therefore exists for a formulation that permits a plurality of different pigment preparations to be prepared in a dry form that is easily and rapidly dispersible in a base medium. Examples of dry forms of pigment formulation asserted to be easily and rapidly dispersible in a base medium are disclosed in the publications of Rance et al (2007), Reischer and Gomez (2007), Reisacher et al (2008), Ortalano et al (2008), Tauber et al (2010), Plueg and Lopez (2010), Wenning and Loest (2010), Roy et al (2010) and Kruithof et al (2010).

The publication of Ranee et al (2007) discloses pigment granules including mixtures of various organic or various inorganic pigments or mixtures of organic and inorganic pigments. In addition to these "tinting materials" the granules are disclosed as optionally containing at least one non-ionic surface-active additive based on polyethers such as unmixed polyalkylene oxides, like polyethylene oxides and polypropylene oxides, or alkylene oxide block copolymers or copolymers comprising polypropylene oxide and polyethylene oxide blocks. The publication states that the unmixed polyalkylene oxides and copolymers comprising polypropylene oxide and polyethylene oxide blocks are obtainable by polyaddition of the alkylene oxides to saturated or unsaturated aliphatic and aromatic alcohols and aliphatic amines. Suitable alkylene oxide block copolymers that are known and commercially available are identified in the publication by the trade names TETRONIC™ and PLURONIC™. These trade name products include alkoxyiated adducts such as ethylenediamine tetrakis (ethoxylate-block-propoxylate) tetrol (BASF). The publication further states that alkylene oxide block copolymers may be selected with different hydrophilic-lipophilic balance values according to the medium in which the pigment granules are to be used, but does not appear to disclose any examples of formulations containing these formulants.

The publication of Reischer and Gomez (2007) discloses pigment preparations asserted to be comparable to liquid pigment formulations with regard to colour properties and dispersibility, but not requiring the addition of dried-crust inhibitors, freeze resistance enhancers and anti-skinners. The publication states that simply drying a liquid formulation does not provide solid pigment preparations having comparable application properties. The publication discloses pigment formulations including as an essential ingredient from 10 to 40% by weight of at least one non-ionic surface-active additive based on polyethers, The pigment granules disclosed are prepared by wet comminuting the pigment as an aqueous suspension in the presence of at least some of the non-ionic surface active additive. The suspension is then spray dried following addition of the balance of the additive. The additive melts at the drying temperatures used leading to the formation of substantially spherical granules. The additive used in the examples is a block copolymer based on either ethylenediamine/propylene oxide/ethylene oxide or propylene oxide/ethylene oxide as the additive. It is stated that the block copolymers are selected with different hydrophilic-lipophilic balance values depending on the application medium in which the pigment granules are to be used. The median particle size of the single pigment granules is disclosed to be in the range 270 to 330 μm. Examples of pigment granules including only a single pigment are disclosed.

The publication of Reisacher et al (2008) discloses solid pigment preparations comprising as essential constituents at least one pigment, at least one water-soluble surface active additive and an antioxidant. A filler (without self-colour) is an optional component of the "colour conferring component" comprising the pigment. Examples of formulations comprising a block copolymer based on propylene oxide/ethylene oxide as the water-soluble surface active additive and tetrakis [methylene (3,5-di(tert-butyl) -4-hydroxyhydrocinnamate)]methane (IRGANOX™ 1010), octadecyl 3,5-di-tert-butyl)-4-hydroxyhydroycinnamate (IRGANOX™ 1076) and tris[2,4-di(tert-butylphenyl)phosphite (IRGAFOS™ 168) as antioxidants are disclosed. The examples comprise a single pigment and do not include a filler. The antioxidant is included to stabilise the pigment preparations so they can be dried at temperatures of greater than 70° C. without, risk of auto-ignition.

The publication of Ortalano et al (2008) discloses a stir-in pigment composition. The composition comprises one or more acetylenic-based surface-active agents. The publication of Tauber et al (2010) discloses pigment preparations comprising poly(alkyl ether). The publication of Plueg and Lopez (2010) discloses universal stir-in pigment preparations containing an additive based on polyalkylene glycols. The additive is an amino derivative of a polyalkylene glycol. The publication of Wenning and Loest (2010) discloses compositions for producing universal pigment preparations containing a combination of a block-copolymeric styrene oxide-containing polyalkylene oxide and a ketone-aldehyde resin. Surprisingly, the combination was found to be soluble in water. The publications of Roy et al (2010) and Kruithof et al (2010) disclose solid preparations comprising a pigment and a dispersant resin. The dispersant resins are polymers having pendant hydrophilic polyalkylene oxide side groups.

Despite these many alternatives the need for a formulation that permits a plurality of different pigment preparations to be prepared in a dry form that is consistently, easily and rapidly dispersible in a base medium remains.

It is an object of the invention to provide improved methods, paint systems and/or dispensing systems that address one or more of the problems identified above. In particular, it would be desirable to separate the final paint colour from technical inaccuracies and user skill at the point of sale. It would also be desirable in some (but not all) applications to allow the sale of colour to be separate from the sale of base paint, enabling consumer access to bespoke colours and the procurement of colour through non-traditional sales channels separate from the base paint. It is an object of the present invention to provide a combination of formulants that permit a plurality of different pigment preparations to be prepared in a dry, flowable, particulate form suitable for use in the improved methods and systems. It is an object of the present invention to provide an improved method of colouring base media such as paint at the point-of-sale. These objects are to be read in the alternative with the object at least to provide the public with a useful choice.

Reference to any publication or other prior art does not constitute an admission that such prior art forms part of the common general knowledge.

SUMMARY OF THE INVENTION

In a first aspect the invention provides a dry pigment formulation paint system including: a plurality of dry pigment formulation doses, each dry pigment formulation dose comprising grains or particles of one of a plurality of dry pigment formulations, each dry pigment formulation consisting of one or more dry pigment formulations; and one or more liquid paint bases; wherein a set of dry pigment formulation doses selected from the plurality of dry pigment formulation doses provides a defined paint colour when dispersed in a paint base.

In this first aspect the grains or particles of dry pigment formulation are formed into a dry pigment formulation dose. This is distinct from formation of grains of unprocessed dry pigments and subsequent mixing of those grains to build up a desired colour profile.

Preferably at least some of the dry pigment formulations each include a plurality of dry pigments. Preferably each dry pigment formulation includes a plurality of dry pigments.

Preferably each dry pigment formulation dose is a tablet. Alternatively each dry pigment formulation dose is a capsule. Optionally, each dry pigment formulation dose may further include one or more: dispersants, disintegrating agents, fillers, surfactants and/or tableting aids. Preferably each dry pigment formulation dose includes a predetermined amount of dry pigment formulation.

Preferably the paint system includes between 8 and 32 dry pigment formulations and the same number of dry pigment formulation dose types, each type including dry pigment formulation doses of a single formulation. More preferably the paint system includes between 8 and 24 dry pigment formulations and the same number of dry pigment formulation dose types, each type including dry pigment formulation doses of a single formulation. Still more preferably the paint system includes 16 dry pigment formulations and 16 dry pigment formulation dose types, each type including dry pigment formulation doses of a single formulation.

Preferably the paint system, includes one or more paint bases.

In a second aspect the invention provides a dry pigment formulation production method including: producing a plurality of dry pigment formulation doses, each dry pigment formulation dose comprising grains or particles of one of a plurality of dry pigment formulations, each dry pigment formulation consisting of one or more dry pigment formulations; dispensing a set of dry pigment formulation doses selected from the plurality of dry pigment formulation doses, the set of dry pigment formulation doses corresponding to a desired paint colour when dispersed in a paint base.

In a third aspect the invention provides a dry pigment formulation dispensing method including: storing a plurality of dry pigment formulation doses, each dry pigment formulation dose comprising grains or particles of one of a plurality of dry pigment formulations, each dry pigment formulation consisting of one or more dry pigments; dispensing a set of dry pigment formulation doses selected from the plurality of dry pigment formulation doses, the set of dry pigment formulation doses corresponding to a desired paint colour when dispersed in a paint base.

In a fourth aspect the invention provides a dry pigment formulation dispensing system including: a dry pigment formulation storage unit including a plurality of storage regions, each region adapted to store a plurality of dry pigment formulation doses; a dispensing mechanism configured to dispense a set of dry pigment formulation doses from one or more of the storage regions, the set of dry pigment formulation doses corresponding to a desired paint colour when dispersed in a paint base.

Preferably the dispensing system includes a user input device configured to receive from a user a unique identifier of the desired paint colour. Preferably the unique identifier is a machine readable code and the user input device is a code reader. Preferably the machine readable code is a barcode or QR code. Alternatively the unique identifier is a paint name or descriptor.

Preferably the dispensing system includes a plurality of physical paint swatches, each carrying a sample of paint colour and the unique identifier corresponding to the sample of paint colour.

Preferably the dispensing mechanism includes a holding chamber configured to receive a set of dry pigment formulation doses from the storage regions and to hold the set of dry pigment formulation doses and a release mechanism configured to release the set of dry pigment formulation doses from the holding chamber.

Preferably the dispensing system includes a verification system for verifying that a correct set of dry pigment formulation doses has been moved from the storage regions to the holding chamber.

Preferably the dispensing system includes an output device configured to indicate a paint base in which the dispensed set of dry pigment formulation doses is to be dispersed to provide the desired paint colour.

In a fifth aspect the invention provides a dry pigment formulation comprising grains or particles of a single dry pigment formulation, the dry pigment formulation consisting of two or more dry pigments, the dry pigment formulation corresponding to a desired paint colour when dispersed in a paint base.

In a sixth aspect the invention provides a dry pigment formulation dose form, including: one or more walls defining an interior volume and an amount of dry pigment formulation contained in the interior volume, the one or more walls including one or more first polymer walls and one or more second polymer walls, the first and second polymers being soluble in a paint base.

Preferably the one or more first walls form a recess and the one or more second walls seal across an opening of the recess to form the interior volume.

Preferably the one or more first walls are formed from a polymer film having a first thickness and the one or more second walls have a second thickness less than the first thickness.

Preferably the one or more first walls are soluble in a paint base over a first time period and the one or more second walls are soluble in the paint base over a second time period less than the first time period.

In a seventh aspect the invention provides a dry pigment formulation dose form including: one or more polymer walls defining an interior volume and an amount of dry pigment formulation contained in the interior volume, the polymer walls being soluble in a paint base.

Preferably the one or more polymer walls are sealed together to define the interior volume. Preferably the one or more polymer walls are sealed together by heat seals or welds.

In an eighth aspect the invention provides a dry pigment formulation dose strip including a plurality of conjoined dry pigment formulation dose forms according to the previous aspect.

Preferably the dry pigment formulation dose strip includes a line of weakness between each adjacent pair of dry pigment formulation dose forms.

In a ninth aspect the invention provides a dry pigment formulation dispenser including a plurality of storage regions configured to hold a plurality of rolled dry pigment formulation dose strips according to the previous aspect and configured for dispensing of dry pigment formulation doses from the rolled dry pigment formulation dose strips.

In a tenth aspect the invention provides a flowable particulate dry pigment formulation for use in the preparation of coloured base media comprising primary particles of at least one pigment, a carboxylic acid polymer and a non-ionic alkoxylated surfactant. Preferably, the carboxylic acid polymer is an acrylic acid polymer. Preferably, a non-ionic alkoxylated surfactant is an ethylene oxide-propylene oxide diblock copolymer. Most preferably, the flowable particulate dry pigment formulation comprises primary particles of at least one pigment, an acrylic acid polymer and an ethylene oxide-propylene oxide diblock copolymer. A preferred acrylic acid polymer is supplied under the trade name RHODOLINE 226/40™ (CAS#9003-04-7). A preferred ethylene oxide-propylene oxide diblock copolymer is supplied under the trade name MAXEMUL™ (CAS#697765-47-2).

Preferably, the flowable particulate dry pigment formulation additionally comprises a hydroxylated amine. More preferably, the flowable particulate dry pigment formulation additionally comprises 2-amino-2-methyl-1-propanol. A preferred 2-amino-2-methyl-1-propanol is supplied under the trade name AMP 95™ (CAS #124-68-5).

Preferably, the flowable particulate dry pigment formulation is a spray dried flowable particulate dry pigment, formulation.

Preferably, the flowable particulate dry pigment formulation consists essentially of primary particles of at least one pigment, a hydroxylated amine, a polycarboxylic acid and a non-ionic alkoxylated surfactant. Preferably, the flowable particulate dry pigment formulation consists essentially of primary particles of a plurality of pigments, a hydroxylated amine, a polycarboxylic acid and a non-ionic alkoxylated surfactant. More preferably, the flowable particulate dry pigment formulation consists essentially of primary particles of three or more pigments, a hydroxylated amine, a polycarboxylic acid and a non-ionic alkoxylated surfactant.

Preferably, the ratio by weight (w/w) of formulant to total pigment is in the range 0.5 to 3.6% hydroxylated amine, 0.56 to 4.52% polycarboxylic acid and 4.5 to 37.7% non-ionic alkoxylated surfactant. More preferably, the ratio by weight (w/w) of formulant to total pigment is in the range 0.5 to 2.3% hydroxylated amine, 0.3 to 2.3% polycarboxylic acid and 7.5 to 19% non-ionic alkoxylated surfactant. Most preferably, the ratio by weight (w/w) of formulant to total pigment is 0.95% hydroxylated amine, 1.2% polycarboxylic acid and 10% non-ionic alkoxylated surfactant.

Preferably, the carboxylic acid polymer is an acrylic acid polymer, the non-ionic. alkoxylated surfactant is an ethylene oxide-propylene oxide diblock copolymer and the hydroxylated amine is 2-amino-2-methyl-1-propanol.

Preferably, the plurality of pigments are a combination of inorganic and organic pigments.

Preferably, the plurality of pigments are selected from the group consisting of: benzamidazole yellow (pigment code PY 154; azo yellow, yellow H3G; CAS#68134-22-5); isoindoline yellow (pigment code PY 1.39; deep yellow, yellow 3R; CAS #3688-99-0); pyrrole red (pigment code PR254; bright red; CASH 84632-65-5); dioxazine violet (pigment code PV 23; deep violet; CAS#6358-30-1); natural red iron oxide (pigment code PR 102; red ochre, CAS#1309-37-1); pyrrole orange (pigment code PO 73; bright orange; CAS#71832-85-4); phthalocyanine blue BGS (pigment code PB 15.3; fastogen blue; CAS#147-14-8); quinacridone red (pigment code PR 122; magenta (pink E); CAS#980-26-7); natural yellow iron oxide (pigment code PY 43; ocre havane; CAS#64294-91-3); phthalocyanine green BS (pigment code PG 7; phtalo green; CAS#1328-53-6); manganese brown (pigment code PBr8; umber 190; CAS#12713-03-0); manganese brown (pigment code PBr8; umber 390; CAS#12713-03-0); iron oxide hydroxide brown (pigment code PBr 6; umber 65; CAS#1309-37-1); natural red iron oxide (pigment code PR 102; Venetian red); natural yellow iron oxide (pigment code PY 43; dark yellow ocre; CAS#64294-91-3); natural yellow iron oxide (pigment code PY 43; Cyprus lemon ochre; CAS#64294-91-3); bone black (pigment code PBk 9; cosmic black; CAS#8021-99-6); iron oxide red (FE 203) (pigment code PR 101; R-5580; CAS#1309-37-1); yellow iron oxide (pigment code PY 42; yellow iron oxide; CAS#51274-00-1); chalk (pigment code PW 18; champagne chalk; CAS#1317-65-3); chrome oxide green (pigment code PG 17; chrome green; CAS#1308-38-9); ultramarine blue (pigment code PB 29; ultramarine blue; CAS#57455-37-5); ultramarine violet, (pigment code PV15; ultramarine violet; CAS#12769-96-9); titanium dioxide (pigment code PW 6; CR-826; CAS#13463-67-7); ultramarine pink (pigment code PR 259; ultramarine pink; CAS#12769-69-9). More preferably, the pigments are a combination of pigments selected from the group consisting of: titanium dioxide (T102), yellow iron oxide (pigment code PY 42; yellow iron oxide; CAS#51274-00-1), pyrrole red (pigment code PR254; bright reel; CAS#84632-65-5), quinacridone red (pigment code PR 122; magenta (pink E); CAS#980-26-7), dioxazine violet (pigment code PV 23; deep violet; CAS#6358-30-1) and chrome oxide green (pigment code PG 17; chrome green; CAS#1308-38-9). Most preferably the pigments are a combination selected from:

titanium dioxide (TiO$_2$), yellow iron oxide (pigment code PY 42; yellow iron oxide; CAS#51274-00-1), pyrrole red (pigment code PR254; bright red; CAS#84632-65-5) and chrome oxide green (pigment code PG 17; chrome green; CAS#1308-38-9); or titanium dioxide (TiO$_2$), yellow iron oxide (pigment code PY 42; yellow iron oxide; CAS#51274-00-1), pyrrole red (pigment code PR254; bright red; CAS#84632-65-5), quinacridone red (pigment code PR 122; magenta (pink E); CAS#980-26-7), dioxazine violet (pigment code PV 23; deep violet; CAS#6358-30-1) and chrome oxide green (pigment code PG 17; chrome green; CAS#1308-38-9).

Preferably, the particles of the flowable particulate dry pigment formulation are of a hollow doughnut morphology.

Preferably, the particles of the flowable particulate dry pigment formulation have a median diameter in the range 20 to 200 µm and a particle size distribution of less than 1.25. More preferably, the particles of the flowable particulate dry pigment formulation have a median diameter in the range 30 to 120 µm and a particle size distribution of less than 1.25. Most preferably, the particles of the particulate dry pigment formulation have a median diameter in the range 50 to 100 µm and a particle size distribution of less than 1.25.

Preferably, the flowable particulate dry pigment formulation has a bulk density in the range 0.7 to 1.1 g/mL.

In an eleventh aspect the invention provides a method of preparing a flowable particulate dry pigment formulation comprising the step of spray drying an aqueous dispersion of a mixture with a total solids content of 45 to 75% (w/w) comprising at least one pigment, a hydroxylated amine, a polycarboxylic acid and a non-ionic alkoxylated surfactant. Preferably, the method comprises the step of spray drying an aqueous dispersion of a mixture with a total solids content of 45 to 75% (w/w) comprising a plurality of pigments, a hydroxylated amine, a polycarboxylic acid and a non-ionic alkoxylated surfactant. More preferably, the method comprises the step of spray drying an aqueous dispersion of a mixture with a total solids content of 45 to 75% (w/w) consisting essentially of a plurality of pigments, a hydroxylated amine, a polycarboxylic acid and a non-ionic alkoxylated surfactant.

Preferably, the step of spray drying the aqueous dispersion is at an inlet temperature in the range 180 to 240° C. and the outlet temperature is in the range 80 to 120° C. More preferably, the step of spray drying the aqueous dispersion is at an inlet temperature in the range 190 to 235° C. and the outlet temperature is in the range 90 to 110° C.

Preferably, the hydroxylated amine is 2-amino-2-methyl-1-propanol, the carboxylic acid polymer is an acrylic acid polymer and the non-ionic alkoxylated surfactant is an ethylene oxide-propylene oxide diblock copolymer. A preferred 2-amino-2-methyl-1-propanol is supplied under the trade name AMP 95™. A preferred acrylic acid polymer is supplied under the trade name RHODOLINE 226/40™. A preferred ethylene oxide-propylene oxide diblock copolymer is supplied under the trade name MAXEMUL™.

The formulations prepared by the method permit the consistent tinting of base media with uniform colour dispersion.

In a twelfth aspect the invention provides a method of tinting a base medium, to provide a medium of predetermined colour comprising the steps of adding a predetermined amount of the formulation of the first aspect of the invention to a predetermined volume of the base medium and mixing to provide the medium of predetermined colour.

Preferably, the base medium is a surface coating. More preferably, the base medium is selected from, the group consisting of: paint and resin. Yet more preferably, the base medium is paint. Most preferably, the base medium is acrylate paint.

Preferably, the residual moisture content of the formulation is less than 1.5% (w/w) when the base medium is non-aqueous.

In a thirteenth aspect the invention provides an aliquot of the formulation of the first aspect of the invention for use in the method of the third aspect of the invention. Preferably, the aliquot is a compressed form of the formulation of the first aspect of the invention. More preferably, the aliquot is in the form of a tablet.

Preferably, the base medium is a surface coating. More preferably, the base medium is selected from the group consisting of: paint and resin. More preferably, the base medium, is paint. Most preferably, the base medium is acrylate paint. A preferred acrylate paint is supplied under the trade name STOCOLOR OPTICRYL™ matt (Sto AG, Stühlingen).

Preferably, the aliquot is provided in a sealed package. More preferably, the material of the package is capable of dissolution in the base medium.

In a fourteenth aspect the invention provides a blend of two or more formulations of the first aspect of the invention for use in the preparation of a coloured base medium where each of the two or more formulations comprises primary particles of a different pigment.

In a fifteenth aspect the invention provides a package comprising two or more formulations of the first aspect of the invention for use in the preparation of a coloured base medium where each of the two or more formulations comprises primary particles of a different pigment.

Preferably, the material of the package is capable of dissolution in the base medium.

In the description and claims of this specification the following acronyms, terms and phrases have the meaning provided: "block polymer" means a polymer in which the monomers are arranged in blocks, e.g., -AAAA-BBBB-; "CAS#" means Chemical Abstracts Service (Columbus, Ohio) registry number; "comprising" means "including", "containing" or "characterized by" and does not exclude any additional element, ingredient or step; "consisting of" means excluding any element, ingredient or step not specified except for impurities and other incidentals; "consisting essentially of" means excluding any element, ingredient or step that is a material limitation and "consists essentially of" has a corresponding meaning; "copolymer" means a polymer formed by the polymerization of two or more monomers; "flowable" means capable of being poured from a container or package; "formula" means a list of ingredients with which a formulation is prepared; "formulant" means an ingredient used in the preparation of a formulation; "formulation" means a material or mixture prepared according to a formula; "hydrophilic" means having a tendency to mix with, dissolve in, or be wetted by water; "hydrophobic" means tending to repel or fail to mix with water; "pigment" means a material or substance used for tinting a base medium; "pigmentary colour" means colour observed as a consequence of the absorption of light; "plurality" means two or more; "primary particles" means the smallest particles of a comminuted material or substance; "structural colour" means colour observed as a consequence of the refraction of light; "synthetic" means prepared by chemical synthesis; "tinting" means the mixing of one or more pigments with a base medium to provide a coloured medium.

The trade name product MAXEMUL 7101™ (Product code ETK1385, Croda Europe Limited) is classified as a non-ionic alkoxylated surfactant. The product is a propylene oxide/ethylene oxide based block copolymer and is a solid with no water or solvents determined to be present by differential scanning calorimetry (DSC) analysis. A full systematic name provided for the product in the Chemical Abstracts Service (Columbus, Ohio) registry is methyloxirane-oxirane diblock copolymer (CAS#697765-47-2).

The trade name product RHODOLINE DP 226/40™ (Solvay New Zealand Limited) is classified as a dispersant and as a 40% (w/w) solution. The trade name product is identified as both an acrylic acid-methacrylic acid copolymer (Safety Data Sheet, Solvay New Zealand Limited) and an acrylic acid polymer (CAS#9003-04-7). In the description and claims of this specification the phrase "acrylic acid polymer" will be understood to encompass either or both of the polymer and copolymer.

The trade name product AMP-95™ (Dow Chemical (NZ) Limited) is classified as a hydroxylated amine and supplied as a 95% (w/w) solution of a mixture of isomers. The full systematic name provided for the product in the Chemical Abstracts Service (Columbus, Ohio) registry is 2-amino-2-methyl-1-propanol (CAS#124-68-5).

The phrase "base medium" will be understood to encompass surface coatings such as paints and resins, but most preferably surface coatings such as paint, in particular water based paint such as acrylate paint. The term "tinting" will be understood to encompass the use of materials and substances that may alter the opacity and light scattering properties of a base medium. Where reference is made to the use of "a plurality of pigments" the use of two or more pigments of different, chemical composition will be understood.

The terms "first", "second", "third", etc. used, with reference to elements, features or integers of the subject matter defined in the Statement of Invention and Claims, or when used with reference to alternative embodiments of the invention are not intended to imply an order of preference.

Where concentrations or ratios of formulants or reagents are specified, the concentration or ratio specified is the initial concentration or ratio of the formulants or reagents. For example, the formulant 2-amino-2-methyl-1-propanol has a boiling point close to that employed in spray drying and a portion will be lost during preparation of the particulate dry pigment formulation. Where values are expressed to one or more decimal places standard rounding applies. For example, 1.7 encompasses the range 1.650 recurring to 1.7499 recurring.

BRIEF DESCRIPTION OF THE DRAWINGS

The invention will now be described with reference to embodiments or examples, with reference to the accompanying drawings, in which:

FIG. 3 is a side view of the dispensing system of FIG. 2;

FIG. 4 is a front view of the dispensing system of FIG. 2;

FIG. 6 is a schematic diagram of a dispensing system according to another embodiment;

FIG. 15 shows a dry pigment formulation dose according to a further embodiment;

FIG. 15A is a side view of the dry pigment formulation dose of FIG. 15;

FIG. 16 shows a dry pigment formulation dose according to another embodiment;

FIG. 16A is a side view of the dry pigment formulation dose of FIG. 16;

DETAILED DESCRIPTION

Figure 1:
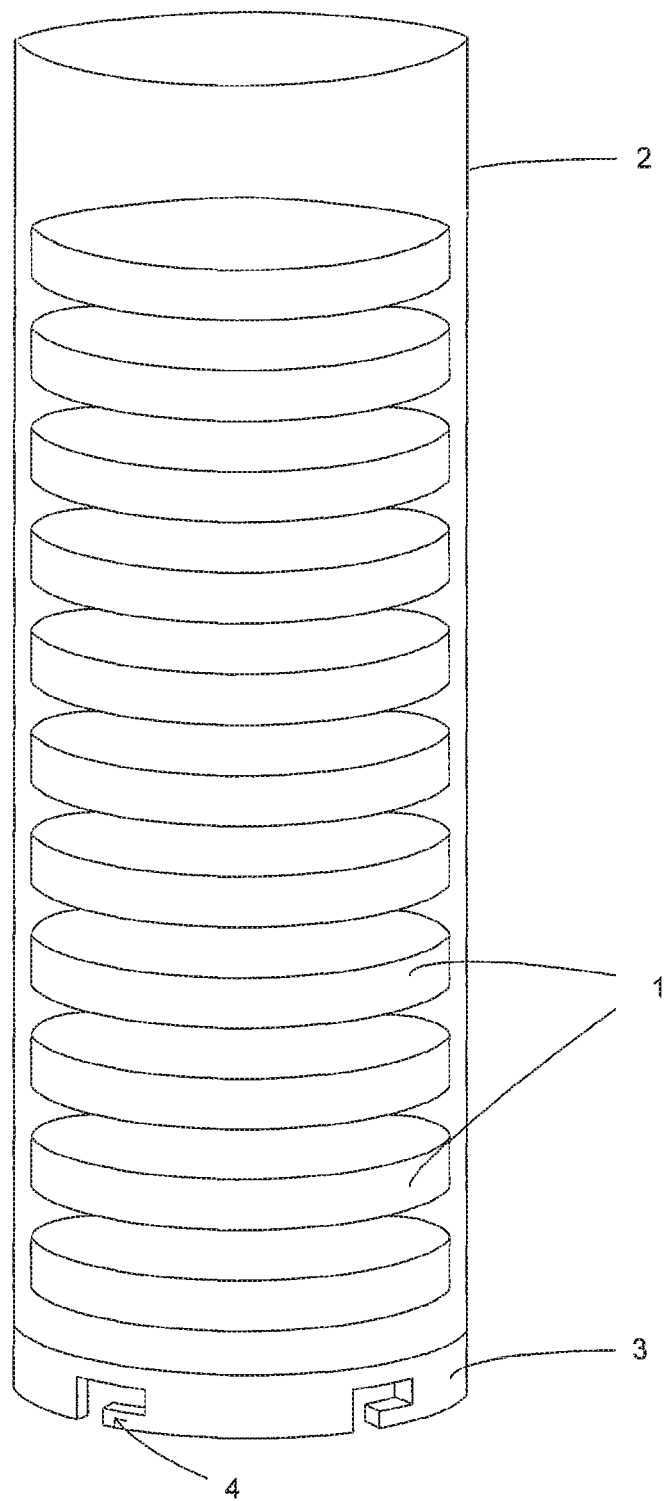
FIG. 1 shows a storage container according to one embodiment.

A new paint system has been devised that provides improved accuracy of paint colour as well as improved retail systems and an improved colour range. Crucially, accuracy depends only on correct counting or dispensing of a correct set of dry pigment formulation doses at the point of sale. This removes the need for accurate measurement of formulation volume or weight at the point of sale and reduces other risks of mis-tinting associated with liquid formulation and prior art dry pigment formulation systems. This in turn removes the need for accurate measurement equipment and user skill and training in the point of sale environment. This not only reduces costs and error in traditional retail sales channels, but also creates opportunities for point-of-sale outside the paint retail environment.

The dose form may be any suitable form for delivery of the dry pigment, formulations into a liquid paint base. For example, solid tablets or capsules may be used. The dose form must be dispersible in the paint base, preferably within a short time period. In some embodiments the dose form may be dispersible in the paint base without the requirement for mechanical mixing. The close form may be designed to be mixed into the base paint at either the point of sale or the point, of use by the consumer.

Further, in preferred embodiments the system relies on dry pigment formulation doses each comprising a single pigment formulation. Each pigment formulation is produced from one or more dry pigments, preferably a plurality of dry pigments. In preferred dose forms, the pigment formulation is prepared in granular or particulate form and then formed into the dose form. This further improves the accuracy of the final paint colour because the granular or particulate form of the dry pigment formulation (rather than the unprocessed dry pigments) is measured and formed into a dry pigment formulation dose. Each grain or particle in a dry pigment formulation dose therefore includes the same dry pigments (i.e. the grains and particles are uniform in their content) and each dose will have accurate amounts of the pigments making up the dry pigment formulation. Each dry pigment formulation dose may be considered a single colour dose, since it is formed from a single pigment formulation. I.e. the grains or particles in a dry pigment formulation dose are uniform.

In some embodiments, where the final formulation is sold in a package or dose form for addition to the colour base, the colour of the formulation may be indicative of the colour of the paint. This will be the case where grains or particles of a single dry pigment formulation make up the formulation.

However, in other embodiments the final formulation will be a mix of two or more dry pigment formulation doses. In these embodiments the individual doses may not reflect the final paint colour.

In this specification a dry pigment formulation includes one or more dry pigment formulations, preferably two or more dry pigment formulations. A dry pigment formulation dose is a close (i.e. a predetermined or standardised unit or quantum, or aliquot) of dry pigment formulation. A set of doses includes one or more dry pigment formulation doses corresponding to a desired colour, when dispersed in a base.

Pigments provide opacity and colour to base solutions, such as paints, coatings, inks, and the like, and alter the appearance by absorbing and scattering light. Pigments may play a role in regulating gloss, and may contribute anti-corrosive properties and reinforce the coating film. Pigments may be classified as active and inactive pigments; the inactive pigments used in coatings such as paints are commonly referred to as fillers. Active pigments may be organic or inorganic. Inorganic pigments include metal oxides such as, for example, zinc oxide, titanium dioxide, iron oxides, metal oxides, metal powders, metal fibres, alumina, Al(OH)3, carbon black, graphite, coal, ground minerals, and the like. Organic pigments are generally composed of carbon, oxygen and nitrogen, as well as other elements such as copper and hydrogen. Quinacridones, napthols, benzinidazolones, pyrroles, acrylides and phthalocyanines are exemplary organic pigments.

The dry pigment formulation doses may also include any suitable combination of dispersants, disintegrating agents (which add disintegration of the dose when mixed with liquid base), fillers, surfactants and/or tabletting aids.

The dry pigment formulation doses each comprise a substantially homogeneous amount of a single dry pigment formulation. A predetermined set of dry pigment formulation doses (one or more doses, but in most cases a plurality of doses) may be mixed with a specified amount of a specified liquid base material to produce a mixed material having a predetermined colour.

A dry pigment formulation is prepared from one or more dry pigments. In preferred embodiments the dry pigment formulations are produced from two or more dry pigments. However, some of the dry colour pigment formulations may in some embodiments include only a single dry pigment.

In one embodiment a dry pigment formulation may be prepared as follows. Any suitable combination of suitable dry pigments may be chosen to make up the dry pigment formulation. The combination may depend on a desired colour, and on compatibilities between different pigments, as will be well understood by those skilled in the art. The pigments may be chosen from a pigment range including but not limited to: azo pigments, Benzimidazolone pigments, phthalocyanine pigments, synthetic iron oxides, rutile pigments, cobalt blue, ultramarine blue, violate manganese, anhydrous iron oxides, limonite and umber pigments and filler pigments such as calcium carbonate, natural and precipitated chalks, and clays.

Precise, predetermined amounts or proportions of the appropriate dry pigment formulations required to achieve a preselected colour are measured.

In one embodiment the pigments may be wet or dry milled to reduce particle size, before or after mixing with each other. The pigments may then be dispersed, for example in a Ross high shear disperser, with one or more polycarboxylic acid dispersants (such as those commercially available from The Dow Chemical Company, Henan Kingway Chemicals Co Ltd and BASF) and a polymeric surfactant. The dispersants and surfactants may be in liquid form, such that a suspension of dry pigments is formed.

The suspension of dry pigments may then be sprayed dried, for example in a lab scale Buchi 290 Spray dryer heated to an inlet temperature of 200 degrees centigrade.

In another embodiment individual pigments may be dispersed in an aqueous solution of a mixture of one or more ionic and non-ionic surfactants to provide single pigment dispersions with a Heqman gauge reading of greater than 7.5 units. The dispersions are blended to provide a homogenous colour dispersion with a total solids content of 60 to 70% (w/w). This colour dispersion is then spray dried to provide a particulate dry pigment formulation of colour with a median particle diameter of 20 to 200 μm, particle size distribution of less than 1.25 and bulk density of 0.9 to 1.1 g/mL. Spray drying has been performed using both a GEA Niro VERSATILE-SD™ size 6.3 spray dryer (GEA Process Engineering) equipped with a pressure nozzle and a GEA Niro MOBILE MINOR™ spray dryer (GEA Process Engineering) equipped with a rotary atomiser.

The resultant pigment formulation is an easy dispersible pigment that can be stirred directly into an aqueous paint system. Preferably the dry pigment formulation will disperse in the paint without the need for mechanical mixing. However, in some embodiments mechanical mixing may be used (for example using mechanical mixers that are already common in the paint retail environment).

Thus, the measured dry pigments are mixed to a substantially homogeneous form and the resulting mixture is formed into a granular or particulate form. In preferred forms each grain or particle contains a substantially similar blend of the dry pigments (i.e. the pigments forming the dry pigment, formulation). Preferably the grains or particles are of substantially similar size. For example, the grains may be between 2 and 400 μm, preferably 20 to 200 μm, in diameter.

The grains or particles of dry pigment formulation are then formed into a dry pigment formulation dose. A predetermined amount of grains or particles is measured and then formed into a dose. The creation of grains or particles of dry pigment formulation before creation of the dry pigment formulation dose contributes to the final accuracy of the paint colour.

The close may preferably be a tablet or capsule. However, other dose forms such as sachets or containers may be used in some embodiments. Preferably the entire dose form, including any outer containing layer, is suitable for dispersal in a liquid base. This ensures that the entire dose is easily added, without error, to the liquid base.

In one embodiment the dose is a tablet form, preferably an encapsulated tablet form. The tablet must have sufficient strength to survive handling, but should break apart and disperse quickly once added to the liquid base. A tablet form may include a soluble outer layer designed to assist in forming of the tablet or in protection of the tablet before addition to the liquid base. The outer layer should break down quickly once added to the liquid base. Suitable materials will depend on the base. For example, in water-based paints the outer should be water-soluble, while in oil-based paints the outer should be soluble in the appropriate oil.

In a preferred form, the dose is a capsule form. Preferably the capsule casing will ultimately dissolve completely, so that there are no solid remnants in the liquid paint. Preferably the pigment is released into the paint in a short time, although the casing itself may dissolve in slightly slower time. It should be possible to disperse the pigments fully in the paint base with around 2-10 minutes mixing time (using manual mixing, but optionally a mechanical mixer may be used). Further, the capsule casing should not significantly alter the properties of the paint.

Figure 10:
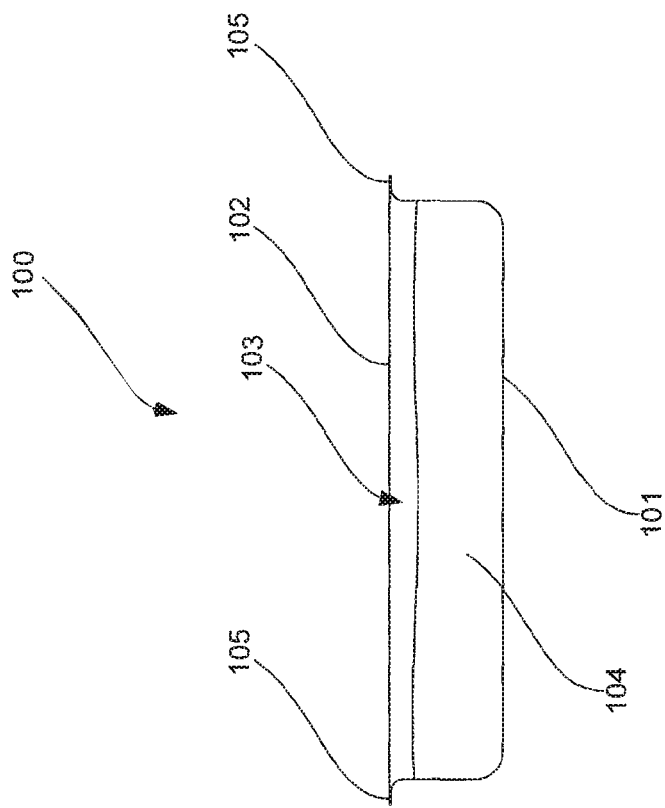
FIG. 10 shows a dry pigment formulation close according to one embodiment.

One embodiment of capsule is shown in FIG. 10. In this embodiment a two part capsule is used. The capsule 100 includes a lower portion 101, which may be made from a suitable film soluble in the paint base, including any suitable polymer film. The lower portion 101 may be made from a solution-cast polyvinyl alcohol film. The film may have a thickness that provides sufficient structure to the capsule, but which dissolves in the paint base over an acceptable time frame. The film may have a thickness around 0.05-0.2 mm, preferably around 0.1-0.15 mm.

The capsule may also include an upper layer or sealing portion 102. The upper layer 102 should be formed from a material that dissolves in the paint base over an acceptable time frame. However, due to the two part construction of the capsule, the upper layer 102 need not contribute to the same extent as the lower portion 101 to the structure of the capsule. Thus, in one embodiment, it is possible to use a material for the upper layer 102 that dissolves more quickly than the lower portion 101.

The upper layer 102 may also be formed from a material that can be joined to the lower portion by conventional techniques such as heat sealing, heat welding or the use of suitable adhesives. This joining of the two portions 101, 102 forms a closed capsule with an interior volume 103. The dry pigment formulations 104 may be added to this interior volume 103 before joining of the two portions 101, 102. A small sealing lip or perimeter 105 may be provided for joining of the lower and upper portions 101, 102.

The upper layer 102 may be formed from a suitable polymer film. The upper layer 102 may be a polyvinyl alcohol film of around 0.05 mm. thickness, such as MonoSol M8630 polyvinyl alcohol film. Testing shows that the upper layer 102 formed of 0.05 mm polyvinyl alcohol film will dissolve quickly in paint (in approximately 30 seconds). Note that this layer must dissolve in a paint base that will be at room temperature and (in the case of water-based paints) is only around 50-60% water. In some embodiments the upper layer may dissolve sufficiently to release the dry pigment formulations in less than five minutes, preferably less than 2 minutes, more preferably less than one minute. This exposes the pigments, which will be mixed into the paint base. The lower portion 101 may dissolve in slower time, but preferably dissolves entirely within about an hour, preferably less than half an hour. This two part structure therefore provides sufficient rigidity through the lower portion 101 for convenient handling and storage of the doses, but quick dispersal of pigments through dissolution of the upper layer 102.

The polyvinyl alcohol films used for the lower and upper portions 101, 102 may be around 88% hydrolysed polyvinyl alcohol; and may have an average molecular weight of around 30,000-70,000 Dalton.

The lower portion 101 may be shaped by any suitable process. In one embodiment the lower portions 101 may be vacuum formed.

In one embodiment the capsule 100 may be a short cylinder, with a height of around 6 mm and a radius of around 22 mm. However, any suitable dimensions may be used.

For manufacturing of the capsules, a piece of solution cast polyvinyl alcohol film may be introduced to a shaped vacuum former. The polyvinyl alcohol film may be heated. Once the film is softened the vacuum may be applied to draw the film into the mould to form the lower portion 101.

The dry pigment formulations 104 may then be added to the shaped lower portion 101. The upper layer 102 may then be placed across the opening of the lower portion 101 and a heated stamper, heat welder or the like used to seal around the sealing lip 105.

Figure 17:
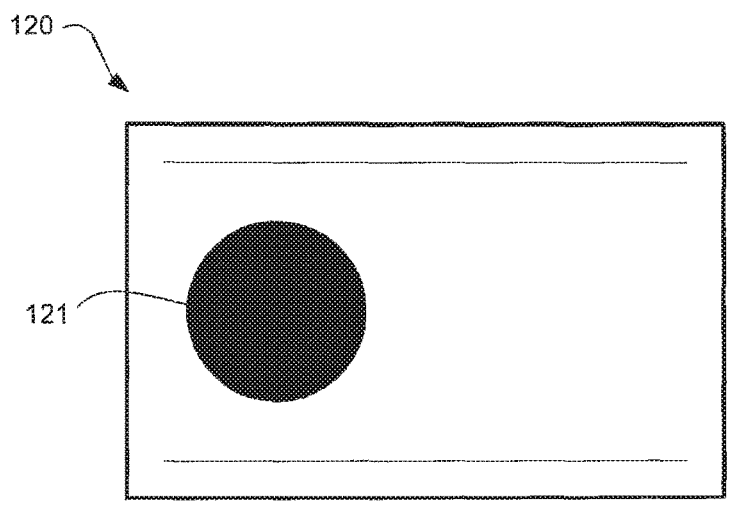
FIG. 17 shows a dry pigment formulation dose according to yet a further embodiment.

FIGS. 15 to 17 show three further embodiments of dry pigment formulation dose 120.

FIG. 15 shows a dry pigment formulation dose 120 that is approximately square when viewed in plan. The dose 120 may be around 24 millimetres square in this view. FIG. 15A is a side view of this dose 120, and this dose may be around 5 mm thick. Such a dose 120 may include around 1 mL of dry pigment formulation.

FIG. 16 shows a dry pigment formulation dose 120 that is rectangular when viewed in plan. The dose 120 may be around 24 millimetres by 48 millimetres in this view. FIG. 16A is a side view of this dose 120, and this dose may also be around 5 mm. thick. Such a dose 120 may include around 5 mL of dry pigment formulation.

Figure 17A:
FIG. 17A is a side view of the dry pigment formulation close of FIG. 17.

FIG. 17 shows a dry pigment formulation dose 120 that is rectangular when viewed in plan, but has a different orientation to that of FIGS. 16 and 16A. The dose 120 may be around 24 millimetres by 48 millimetres in this view. FIG. 17A is a side view of this dose 120, and this dose may also be around 5 mm thick. Such a dose 120 may include around 5 mL of dry pigment formulation.

In the embodiments of FIGS. 15 to 17 the dry pigment formulation doses are in sachet form, with the sachet walls formed from a single film that is soluble in the paint base (e.g. a water-soluble film for an acrylic paint base, such as for example: polyvinyl alcohol film.). The sachet may be formed using a suitable 'form, fill, seal' method using appropriate heat welding or similar techniques to form the individual sachets as they are filled. Such sachets are also sometimes known as 'pillow packs' or 'pillow pouches'.

The film may have a thickness that provides sufficient structure to the capsule, but which dissolves in the paint base over an acceptable time frame. The film may have a thickness around 0.02-0.2 mm, preferably around 0.03-0.06 mm.

In other embodiments the sachets may have dimensions (height by length by width) in the range 15 mm×15 mm×2.5 mm to 150 mm×150 mm×40 mm.

Each dry pigment formulation dose 1, 100, 120 may be printed with a colour patch 121 indicative of the colour provided by the dry pigment formulation included in that dose. Branding information may also be printed on the dry pigment formulation dose if desired.

Figure 18:
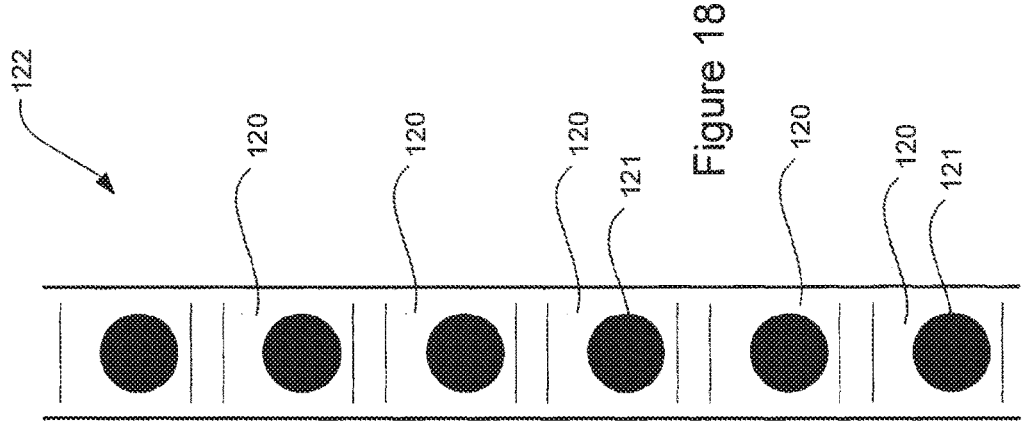
FIG. 18 shows a number of dry pigment formulation doses manufactured in a continuous strip form.

FIG. 18 shows a plurality of dry pigment formulation dose sachets 120. Each dose is formed as a sachet separated from its neighbours by heat welds or similar. This creates a plurality of conjoined sachets forming a strip 122. The individual sachets may also be separated by lines of weakness, such as perforations or the like, allowing the sachets to be conveniently separated from each other.

Figure 19:
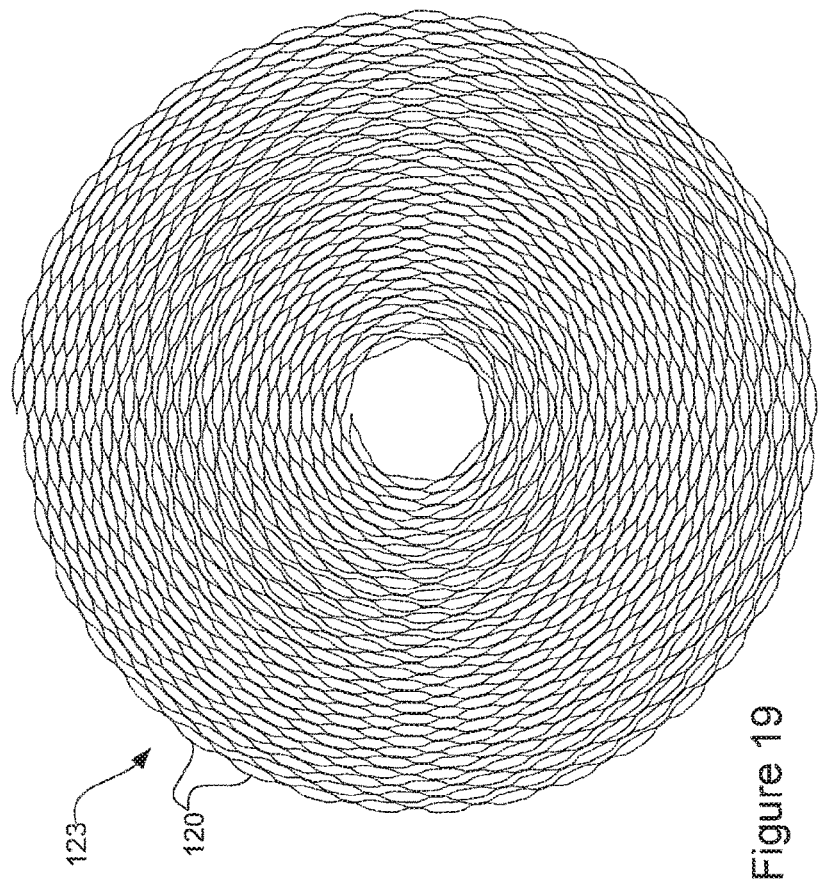
FIG. 19 shows the dry pigment formulation doses of FIG. 18 in a rolled form for storage, transport and/or dispensing.
Figure 20:
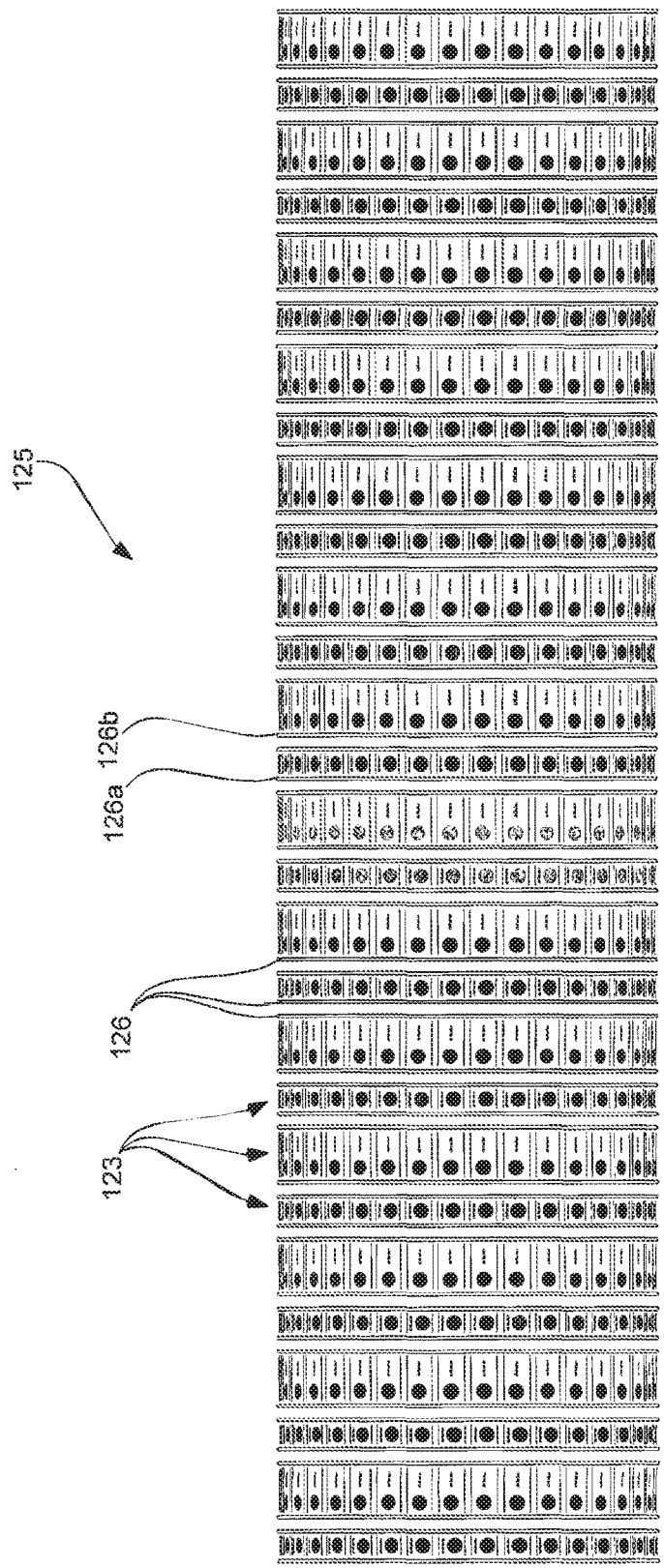
FIG. 20 shows a number of rolls of dry pigment formulation doses arranged side by side for dispensing.
Figure 21:
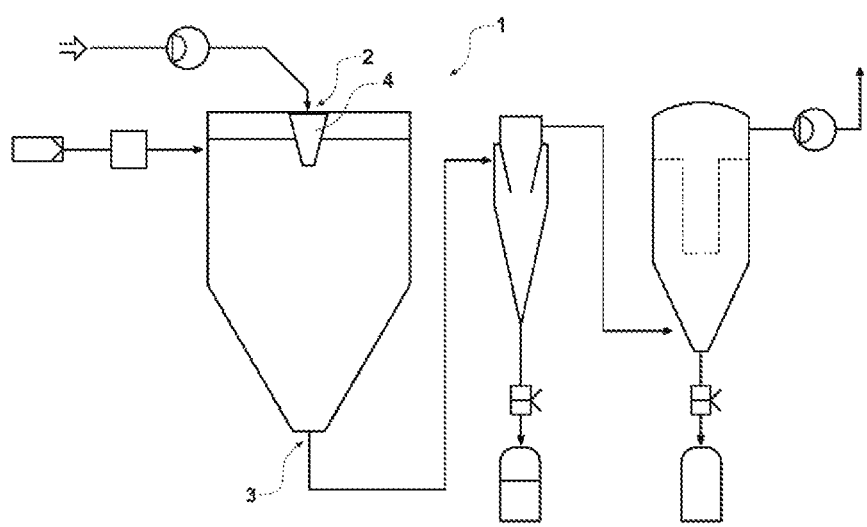
FIG. 21 is a schematic representation of a single-point discharge configuration of a spray dryer (1). The spray dryer (1) is provided with an inlet (2) and an outlet (3) and may be fitted with either a pressure nozzle or rotary atomiser (4).

As shown in FIG. 19 the strip 122 may be rolled to a roll form 123 of conjoined sachets 120. This toll form 123 may be fitted to a suitable wheel dispensing system 125, such as illustrated in FIG. 20. A plurality of sachet rolls 123 are arranged side by side, each mounted on a wheel 126. The wheels 126 may be mounted on a suitable axle, which may be undriven for manual dispensing, or may be mechanised for automated dispensing.

As shown in FIG. 20, two or more wheels 126a, 126b may be provided for each dose type. The first, wheel 126a may store and dispense dry pigment formulation doses of a first size (e.g. 1 mL) and the second wheel 126b may store and dispense dry pigment formulation doses of a second size (e.g. 5 mL). The dry pigment formulation doses carried by the first and second wheels 126a, 126b, being of the same dose type, are formed from the same dry pigment formulation. The wheel dispensing system 125 may include a plurality of such pairs of wheels.

The capsules may be stored in a dry environment to preserve the life of the polymer layers. The use of a desiccant may be used to limit deformation or shape changes of the capsules. In particular, the storage containers and dispensing machines discussed below may provide a dry environment, through the use of suitable desiccants or the like.

In one embodiment each capsule may contain 0.1 to 500 grams of dry pigment formulation, preferably around 0.1 to 50 grams of dry pigment formulation, more preferably around 0.1 to 20 grams of dry pigment formulation. In the overall paint system, with doses of different pigment formulations, the weights of dry pigment formulation in a single capsule may vary between the different formulations. Further, two or more dose forms of the same pigment formulation may be provided, each with a different weight of dry pigment formulation.

The number of dry pigment formulation doses in the paint system is preferably between 8 and 32, more preferably 8-24, ideally around 16. Each dose preferably consists of grains or particles of one of these formulations. More than one dose size of a particular formulation may be provided. This range of formulations provides the ability to build a large range of final paint colours.

The dry pigment formulation doses may be packaged for convenient shipping and distribution in retail sites. For example, the dry pigment formulation doses may be packaged centrally in storage containers and then shipped to retailers. The storage containers may be configured for installation in a dispensing machine, as discussed below.

The use of the commercially available ED pigments is contemplated. Other types of dry, surface-coated pigments that have a surface coating that facilitates relatively rapid and complete dispersal in a base solution may also be used. Readily dispersible, dry surface-coated pigments that are developed in the future, having as yet unanticipated surface chemistries, that have rapid and complete dispersal properties in specified base solutions are also contemplated for use in the compositions and methods of the present invention.

It may be desirable to derive pigment formulations using a combination of dry pigments having the same or similar surface chemistries. Combining pigments having the same or similar surface chemistries procured from a single manufacturer may be preferred, for example, in some situations. In other circumstances, it may be possible to combine pigments having different surface chemistries that are compatible with one another and with common base solutions. The present invention contemplates formulations comprising combinations of pigments having the same, similar and dissimilar surface chemistries.

A filler composition may be mixed with the combination of dry pigments prior to dose formation. Filler components may be referred to as "inactive pigments," and may be formulated to confer desirable properties to the base solution and the final, mixed solution. Fillers often comprise inorganic minerals in powder form that are not soluble in the base paint and are typically white or slightly colored. Fillers are used to increase the bulk of the solution (e.g., paint) and to enhance the performance of the solution (e.g., paint). Examples of fillers include calcium carbonate, silicates (such as talc, kaolin, and mica), silica, glass beads, aluminium titanate, silicon carbide, silicon nitride and barium sulphate. Other materials may also be used as fillers.

The ratio of filler composition to pigment mixture may vary according to colour formulations, base solution, and the like. In some embodiments, an amount of filler is added to the pigment mixture to provide a desired total weight of mixture.

Each dry pigment formulation (plus any filler compositions or and any other desired components), may be processed to provide a substantially homogeneous preparation with accurate chromophoric characteristics, ready to be granulated and then formed into doses in desired quantities.

The dry pigment formulation doses may be packaged for distribution to retailers and customers, and because they are stable and lightweight, they may be conveniently and inexpensively distributed to a variety of final destinations. A relatively modest facility may be employed for colour formulation, mixing of the dry pigment formulations, dose formation and may achieve wide distribution of the dry pigment formulation doses. The systems, and compositions are environmentally sound and require modest energy inputs, both in terms of production of the dry pigment mixtures, and in terms of distribution of them to customers and users. The doses may be packaged in any suitable pouches, or packets, or other types of containers, but preferably are packaged in containers adapted for mounting on the dispensing machine, as discussed below.

The dry pigment formulation doses 1 may be packaged in storage containers 2 such as the storage tubes shown in FIG. 1. Each storage tube 2 holds a plurality of dry pigment formulation doses 1, which in the embodiment shown are generally disc-shaped tablets 1. The storage container 2 also includes a base or mount 3 configured for attachment to a dispensing machine. The bottom of the container 2 is open, allowing doses to be dispensed through the base or mount 3. A seal or releasable closure may be provided at the base to close this opening during transport. In some embodiments this closure may be automatically released by mounting of the container 2 on the dispensing machine.

Preferably a unique mount is provided for each position in the dispensing machine, and a cooperating mount 3 is provided on the corresponding storage tube 2. This ensures that only the correct storage tube 2 (which has been centrally packed with the correct dry pigment formulation doses 1) can be received in a particular mount in the dispensing machine. This may be achieved using different arrangements of mounting features 4. Any suitable mounting features may be used. In the embodiment shown right angle slots 4 will cooperate with suitable protrusions on the dispensing machine mount.

Figure 2:
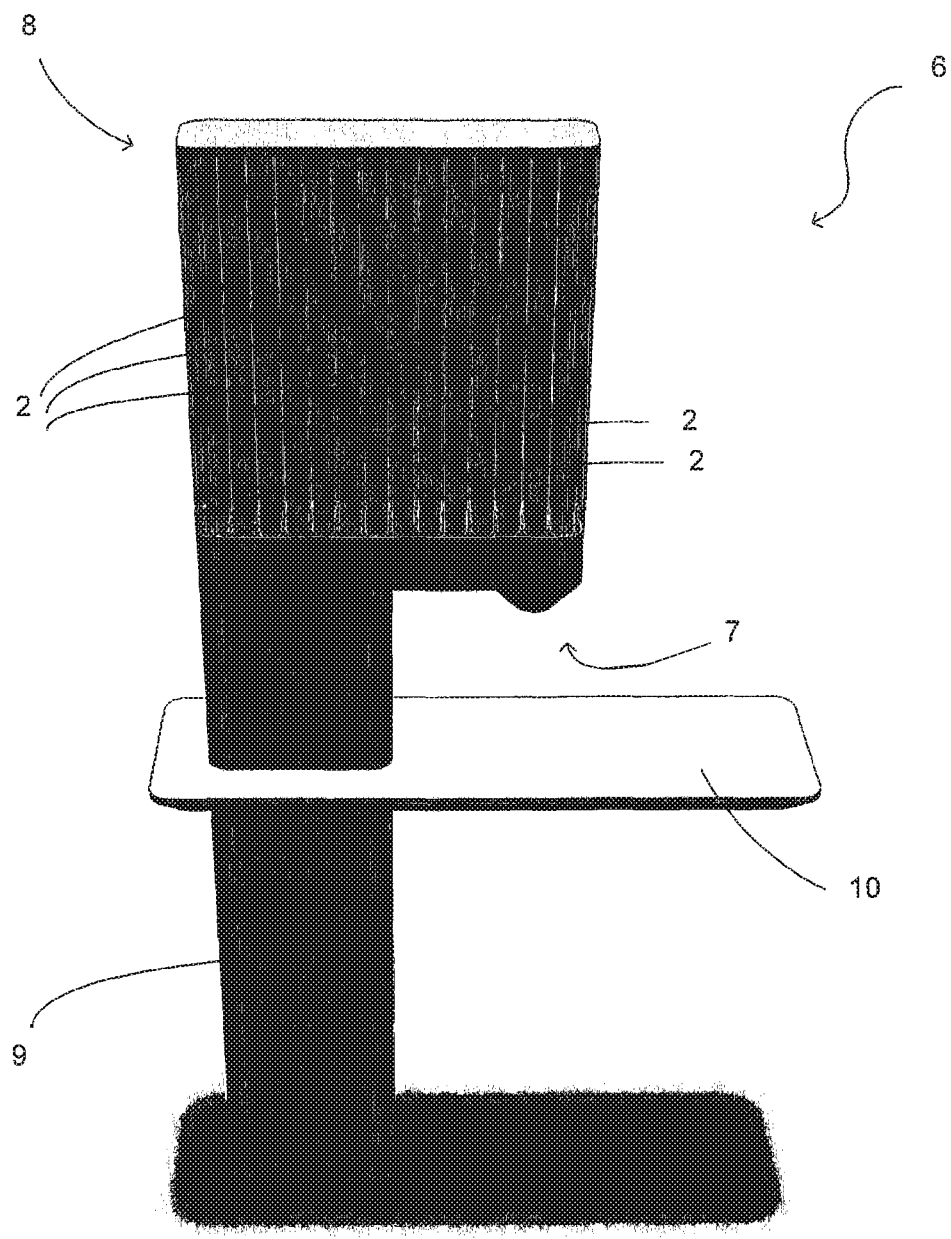
FIG. 2 shows a dispensing system, according to one embodiment.

FIG. 2 shows a dispensing machine 6 including a plurality of storage chambers or containers 2, each holding a plurality of dry pigment formulation doses 1. The storage containers 2 are preferably individually replaceable. The dispensing machine 6 also includes an outlet 7 from which a set of dry pigment formulation doses is dispensed. The dispensing machine 6 has a dispensing head 8 supported at a convenient height by a support 9. Table 10 supports a container (not shown) placed under the outlet 7 to collect the dispensed dry pigment formulation doses. The set of doses may be dispensed directly into a paint base container, or into an intermediate container.

FIGS. 3 and 4 are side and front views of the dispensing machine 6.

Figure 5:
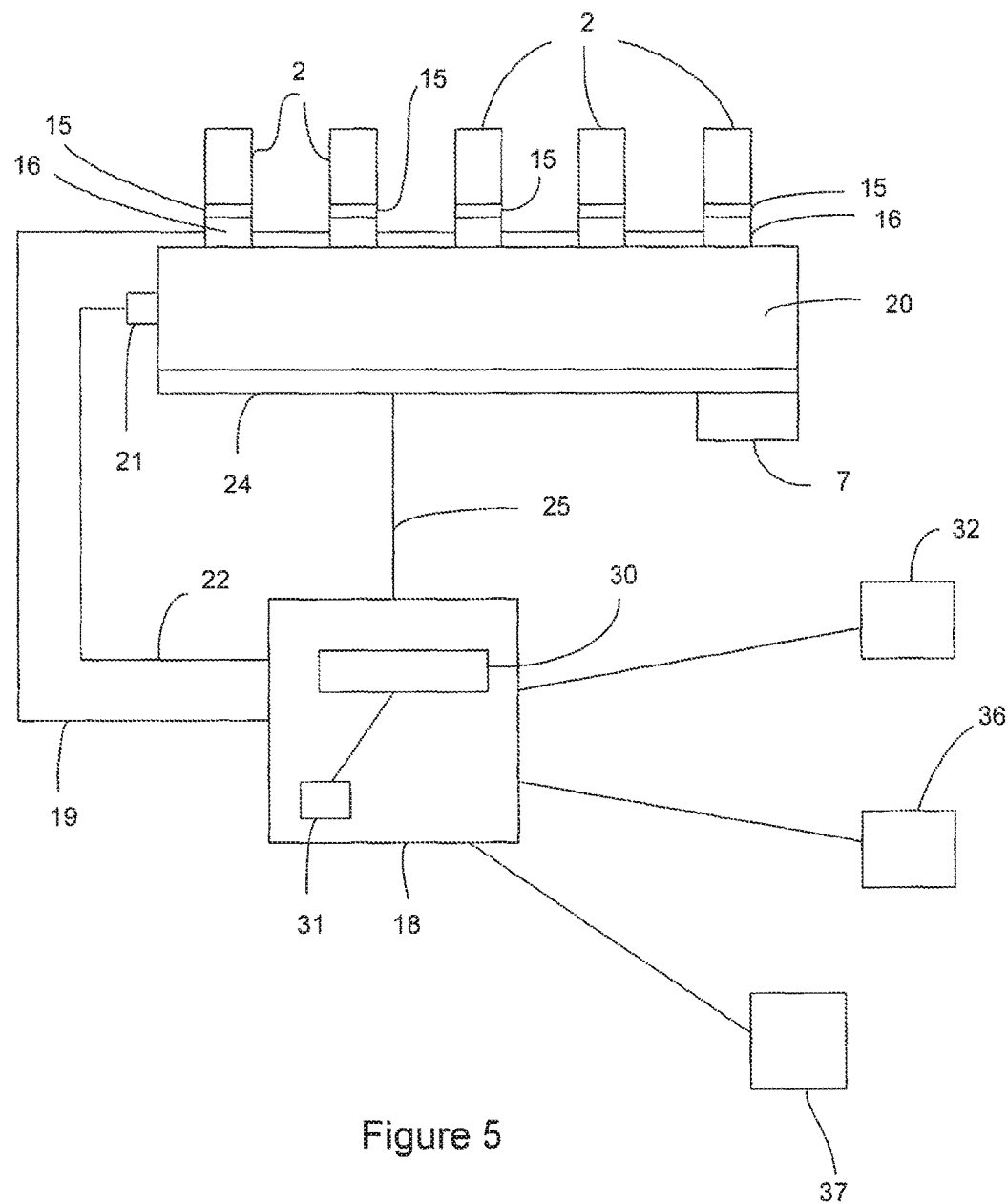
FIG. 5 is a schematic diagram of a dispensing system according to a further embodiment.

FIG. 5 is a schematic diagram illustrating the working of the dispensing machine 6. Each dispensing tube 2 mounts to a unique mount 15 on the dispensing machine 6. A dispensing mechanism includes dispensers 16 associated with each unique mount. Each dispenser 16 is controlled by a controller 18 via control line 19 to dispense a number of dry pigment formulation doses from the corresponding storage container 2. Each dispenser may be any suitable mechanism capable of dispensing a set number of doses. For example, the dispenser may include a moving part with an aperture shaped to receive a dry pigment formulation dose from the container 3. Movement of the moving part (which may be a rotating wheel or a shuttle that moves linearly) causes the aperture to move to a position where the dose can fall downwards. This operation may be repeated to dispense further doses from that container 2.

A set of dry pigment formulation doses corresponding to a desired paint colour is dispensed by the dispensers 16 into a holding chamber 20. In the holding chamber a verification step may be performed to reduce the chance of an incorrect set of doses being dispensed (for example if one of the storage tubes 2 is empty). One or more sensors 21 may be associated with the holding chamber 20 and may provide signals to the controller 18 over sensor line 22. The sensors may include weight sensors, optical sensors etc arranged to detect the presence of dry pigment formulation doses in the holding chamber 20.

Further, each dose may have properties that can be detected for verification purposes in the holding chamber, as well as elsewhere in the dispensing system. For example, each dose comprises a single dry pigment formulation. Each dose therefore has a characteristic, colour, or optical properties, that can be detected, by appropriate optical sensors. Similarly, each dose may have a set weight, dimensions or other characteristics that can be sensed for verification purposes. A human verification may be performed simply by visual inspection of the doses in the holding chamber, which may have transparent walls for this purpose. This may involve a check against a picture of the correct doses, which may for example be printed on a paint swatch or displayed on a suitable display.

An outlet dispenser 24 is controlled by the controller 18 over control line 25 in order to dispense the set of dry pigment formulation doses from the holding chamber 20 through the outlet 7.

FIG. 6 shows an alternative arrangement in which a dispenser 16', holding chamber 20' and outlet dispenser 24' is provided for each storage tube 2. Sensors 27 may also be provided in the storage tubes or containers 2, for example to detect when the container 2 is empty or nearly empty. Sensors 27 (such as optical sensors) may also verify that the correct dose is held in the correct position in the dispensing machine. Similar techniques may be used to those discussed above in relation to verification in the holding chamber 20.

Each storage and dispensing module is connected to the controller by a control and sensing line 28.

In each of FIGS. 5 and 6 the controller includes a processor 30 and a colour database or lookup table 31. A user input device 32 receives a unique identifier of paint colour that will generally be input by a user. The unique identifier may be any suitable identifier, such as a barcode, QR code, paint name, paint number, electronic code (e.g. RFID tag), punch card etc. The user input device 32 may be a suitable reader, such as a barcode reader, QR code reader or RFID reader. Alternatively the user input device may be a keypad or the like allowing the user to input the paint name or number. More than one user input device 32 may be provided, allowing different types of unique identifiers to be input.

Figure 7:
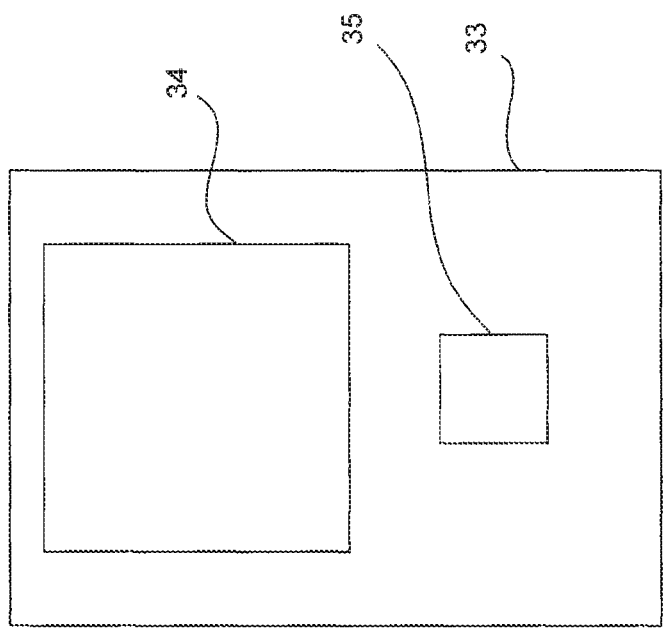
FIG. 7 is a schematic diagram of a swatch according to one embodiment.

FIG. 7 shows a paint swatch 33, which may be in the form of a printed card. The swatch 33 includes a paint colour sample 34 together with a unique identifier 35, shown in the form of a QR code. Further identifiers such as a paint name and any other desired information may also be printed on the paint swatch. In use, a user having chosen their paint colour using a range of swatches, takes the chosen swatch to the user input device 32, and either enters the unique identifier 35 or causes the input device 32 to read the unique identifier 35. The controller receives signals corresponding to the unique identifier from the user input device 32. The controller then uses the paint colour database or lookup table 31 to determine a set of dry pigment formulation doses that corresponds to the chosen paint colour, when dispersed in a liquid paint base. The controller controls the dispensing mechanism in order to dispense the set of dry pigment formulation doses from the storage container 2 to the outlet 7.

The dispensing system may also include an output device 36. The output device may be a printer, audio output (speaker) or preferably a display. The output may provide the user with confirmation or notification of one or more of the following: paint colour chosen (e.g. paint name or unique identifier), dispensing complete, correct paint base to be used etc. In one embodiment the output device 36 may print a ticket, or label with a corresponding QR code/identifier and optionally a colour swatch. This ticket or label may conveniently be used at a later time for re-order of further paint formulations. The ticket or label may be attached to a paint tin, or simply retained by the user. In a further embodiment the dispensing system, may be linked to other point of sale systems, such as a cash register system, allowing the cash register system to print the QR code/identifier on a sales receipt.

Figure 8:
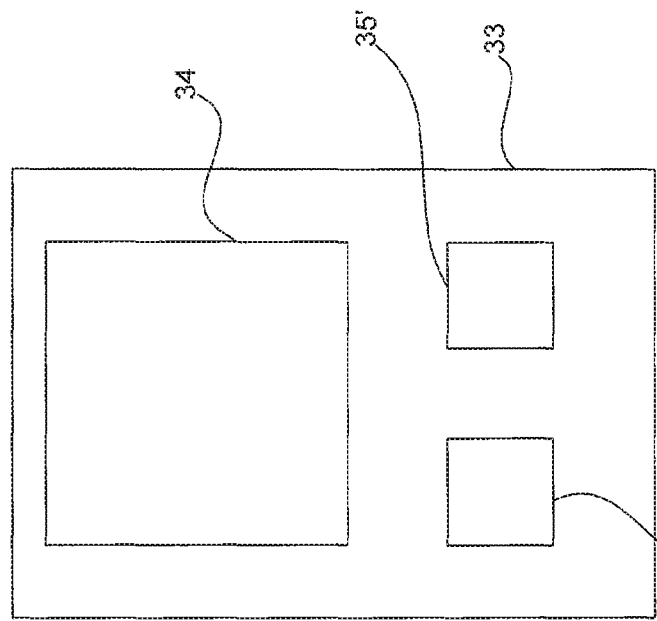
FIG. 8 is a schematic diagram of a swatch according to a further embodiment.

Paint is often sold in a variety of container volumes (50 mL, 1 L, 4 L, 10 L). In one embodiment the user is also enabled to select a paint volume required. The dry pigment formulation doses required to give the desired paint colour depends on the required volume. The system may include a further input device allowing a paint volume to be selected, or this function may be provided by the user input device 32. Alternatively, the paint swatch may include two or more identifiers 35, 35' (FIG. 8), all corresponding to the same paint colour but each to a different paint volume. Reading of the appropriate identifier will result in dry pigment formulation doses being dispensed for the correct paint volume.

Figure 9:
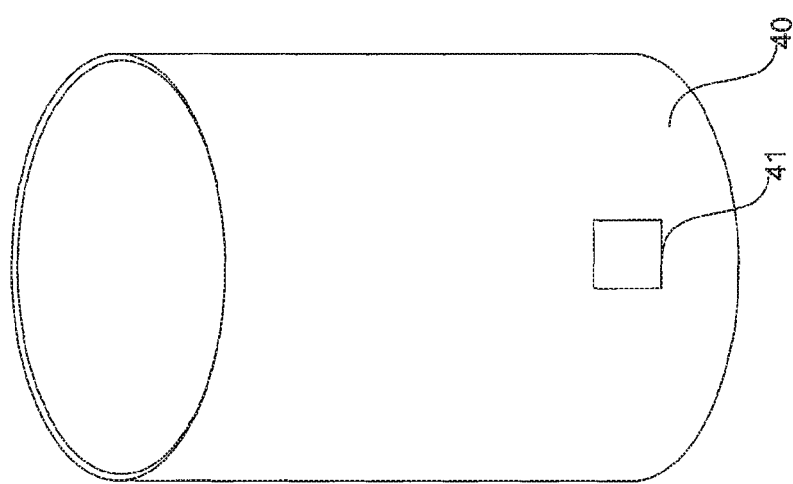
FIG. 9 shows a paint base container according to one embodiment.

In another embodiment the system verifies the correct paint base. In this embodiment the paint containers 40 (FIG. 9) each carry a unique identifier 41 such as a barcode, QR code or RFID tag. The identifier will identify the base type and, optionally, volume. The dispensing system prompts the user to scan the paint base identifier and confirms that the correct base has been chosen for the desired paint type. Further, the volume determination on which the dispensing step is based may be based on this scan of the physical paint base container.

Figure 11:
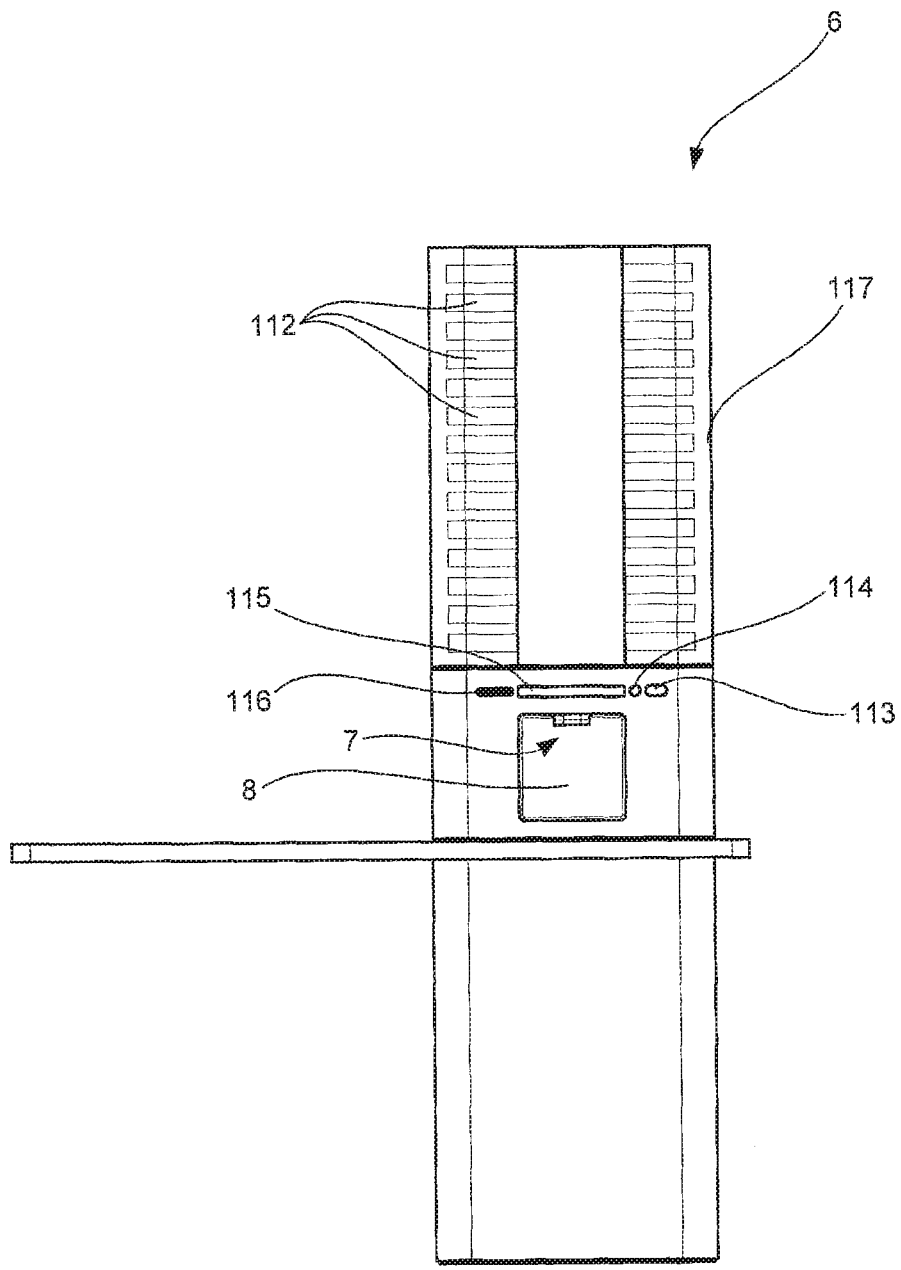
FIG. 11 shows a dispensing system according to a further embodiment.
Figure 12:
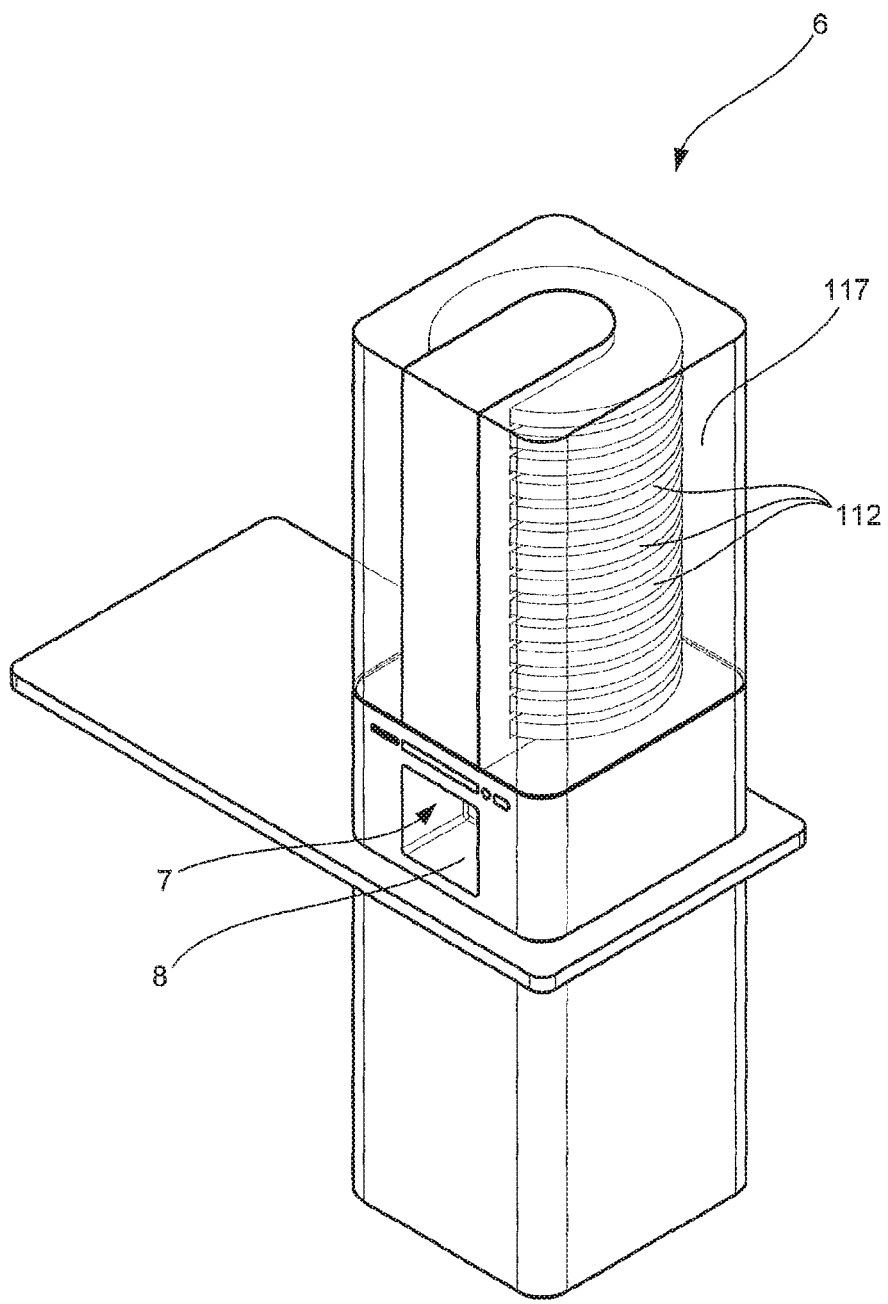
FIG. 12 is a further view of the dispensing system of FIG. 12.

FIGS. 11 and 12 shows another embodiment of dispensing machine 6 including a plurality of storage units 112, each holding a plurality of dry pigment formulation doses. The storage units 112 are preferably individually replaceable.

The storage units may be appropriate chambers, or preferably carousels as shown in FIG. 12. The dispensing machine 6 also includes an outlet 7 from which a set of dry pigment formulation doses is dispensed. A user may present a scoop, cup, bag or other receptacle within recess 8 below the outlet 7, to receive dispensed dry pigment formulation doses. One or more user interface devices 113, 114, 115, 116 may be provided. These devices may include one or more of: a barcode reader, a QR code reader, an RFID reader, a keypad, a touchscreen, buttons, dials, speakers, display screens, printers, stamps or the like allowing the user to input information into the machine 6, or receive information from the machine 6. The machine may include a transparent cover 117, allowing a user to see the various colours printed on the individual dry pigment formulation doses.

Figure 14:
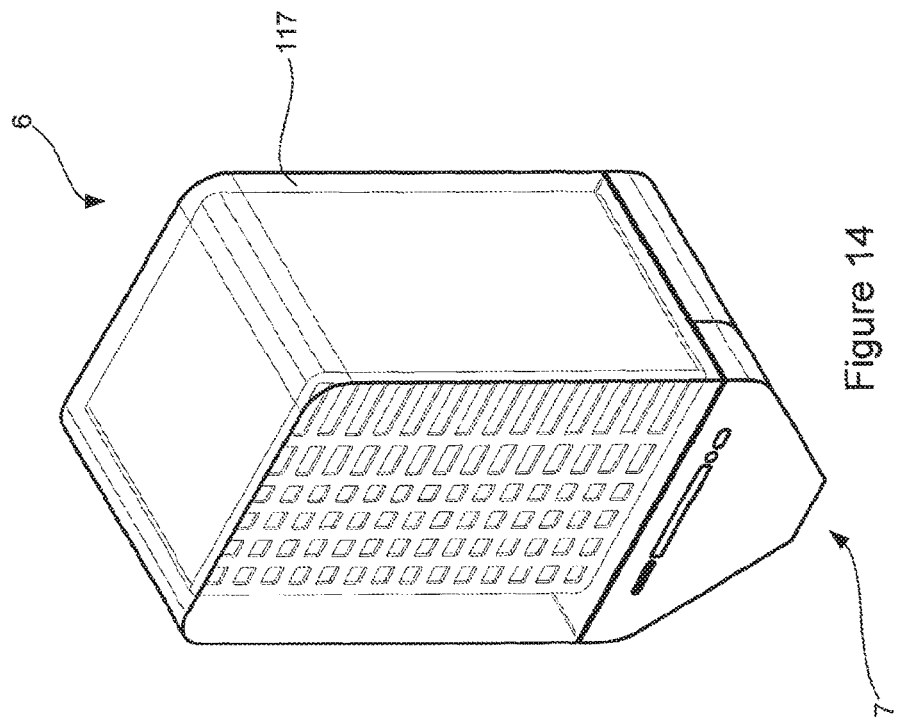
FIG. 14 is a further view of the dispensing system of FIG. 13.
Figure 13:
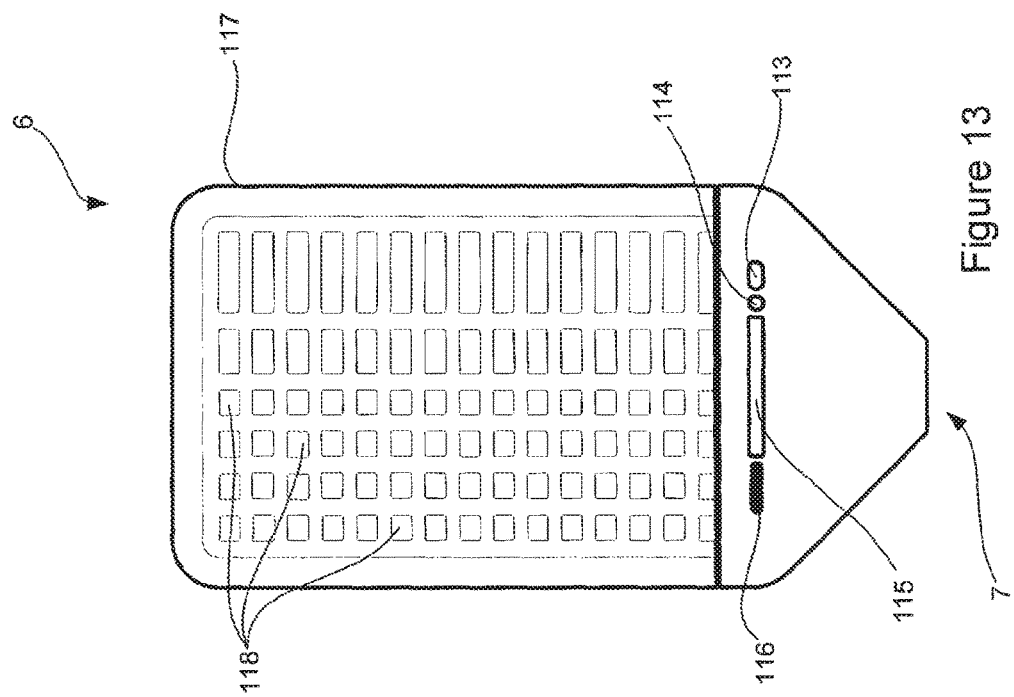
FIG. 13 shows a dispensing system according to another embodiment.

The machine of FIGS. 11 and 12 is a free standing model. FIGS. 13 and 14 shows a further embodiment of dispensing machine 6 intended for wall-mounting. In this machine the dry pigment formulation doses may be stored in chambers 118 running front to back within the machine 6. The machine may otherwise be similar to that of FIGS. 11 and 12.

In contrast to prior systems, centrally produced accurate dry pigment formulation doses are used. At point of sale tinting accuracy depends only on dispensing of the correct number of each dry pigment formulation dose, i.e. correct dispensing of a set of doses, which is essentially a selection and counting operation rather than a measurement operation. No measurement of weight or volume is required at point of sale. Importantly, this removes the effects of retail staff skill, and retail apparatus, on final paint colour.

Accuracy is ensured by accurate central production of the dry pigment formulation doses. Expensive and accurate measurement equipment is required only at the central point of dose production.

The pigments used in tinting to provide coloured media include both inorganic and organic pigments. In addition to providing colour, inorganic pigments may be used to provide lustre or opacity. Inorganic pigments include metal oxides, salts and minerals. Examples of inorganic pigments are carbon black, titanium dioxide, iron oxides, zinc chromates, azurite ($Na_7Al_6Si_4O_{24}S_2$), chromium, oxides, cadmium sulphides, lithopone (ZnS mixed with $BaSO_4$). Organic pigments are typically synthetic compounds such as monoazos, diazos, azo condensations, azo salts, azo metal complexes, benzimidazolones, phthalocyanides, anthraquinones, quinacridones, dioxazines, perylenes and thioindigos. Extender pigments (or "fillers") may also be used. Extender pigments include calcium carbonate (chalk), hydra ted magnesium silicate (talc), barium, sulphate (barytes), hydrated aluminium, silicate (kaolin), silicon dioxide (silica) and hydrous aluminium potassium silicate (mica).

The primary particles of pigments therefore possess a diverse range of chemical and physical properties. A combination of formulants that remain effective to disperse the primary particles of a broad range of pigment preparations and combinations of the primary particles of those preparations when a spray dried formulation of the pigments is mixed with a base medium has been identified. The formulants of the combination must necessarily be compatible with each other and the pigment preparations and the preparation of particles by spray drying. In addition to being effective to disperse the primary particles of pigment when added to a base medium the requirements of both the distributors and end users of the spray dried particles must be met. These requirements include the spray dried particles having sufficient structural integrity to avoid crushing and settling during transport and storage. It will be recognised that the dispensing of a free flowing spray dried particulate dry pigment formulation satisfying these requirements may be performed either gravimetrically or volumetrically.

The formulations of the invention permit the tinting of base media with uniform colour. The formulations avoid the limitations of liquid formulations, not being subject to variation attributed to evaporation. The formulations develop full colour rapidly. The formulations readily hydrate and disperse substantially eliminating the formation of agglomerates on mixing. The formulations minimise the requirement to use fillers.

The selection of formulants and spray drying conditions permits the preparation of particulate dry pigment formulations of uniform dispersivity. In this context "uniform dispersivity" is referring to the dispersivity of the primary particles of the plurality of pigment preparations included in the individual particulate dry pigment formulations. The invention permits primary particles of a plurality of pigments to be included in a single particulate dry pigment formulation. This latter particulate dry pigment formulation provides what is referred to here as a "whole colour" formulation. The formulations behave similarly in terms of their dispersivity when mixed with a base medium irrespective of the pigment preparations used. The formulations are flowable and stable, not being subject to dusting or settling, maintaining a uniform bulk density on storage.

The formulations enable a method of tinting base media to provide a medium of predetermined colour that is reproducible between locations and over time. The formulations can be supplied directly to end users as a formulation of a combination of pigment preparations ("whole colour") or a combination of formulations of single pigment preparations to be blended to provide the predetermined colour. The proprietors of custom colour ranges such as the LES COULEURS™ LE CORBUSIER colour range (Les Couleurs Suisse AG) require limited colour deviation in the colours supplied by licensees. The invention therefore permits proprietary custom colour ranges with colour deviations of less than 0.15 to be supplied by directly to end users. All colour deviations reported here were determined according to LCS guideline 001 *Metrological quality guidelines for coating systems* (Edition #5, June 2013).

General Method

Individual pigments are dispersed in an aqueous solution of formulants to provide single pigment dispersions with a Hegman gauge reading of greater than 7.5 units. The percentage of the formulants to pigment in each dispersion is maintained at 1% (w/w) of the trade name product AMP-95™ (hydroxylated amine), 3% (w/w) of the trade name product RHODOLINE DP 226/40™ (polycarboxylic acid) and 10% (w/w) of the trade name product MAXEMUL 7101™ (non-ionic alkoxylated surfactant). The dispersions are blended to provide a homogenous colour dispersion with a total solids content of 60 to 70% (w/w). This colour dispersion is then spray dried to provide a particulate dry pigment formulation of colour with a median particle diameter of 20 to 120 µm, particle size distribution of less than 1.25 and bulk density of 0.9 to 1.1 g/mL. Spray drying has been performed using both a GEA Niro VERSATILE-SD™ size 6.3 spray dryer (GEA Process Engineering) equipped with a pressure nozzle (0.9 mm diameter) and a GEA Niro MOBILE MINOR™ spray dryer (GEA Process Engineering) equipped with a rotary atomiser (channel wheel). A schematic representation of single-point discharge configuration of a spray dryer is provided in FIG. 1. According to this general method a flowable particulate dry pigment formulation is prepared consisting of 10 to 30% (w/w) of formulants and 70 to 90% (w/w) of two or more pigments.

EXAMPLE 1

Preparation of the Pigment Formulation Designated CT-DPC-T106

The pigments titanium dioxide (TiO$_2$), yellow iron oxide (pigment code PY 42; yellow iron oxide; CAS#51274-00-1) (Lanxess), pyrrole red (pigment code PR254; bright red; CAS#84632-65-5) (Crenovo International) and chrome oxide green (pigment code PG 17; chrome green; CAS#1308-38-9) (Nubiola) were each prepared as a dispersion (Hegman gauge reading of greater than 7.5 units) in an aqueous solution containing a hydroxylated amine (AMP-95™, Dow Chemical (NZ) Limited), a polycarboxylic acid (RHODOLINE DP 226/40™, Solvay New Zealand Limited) and a non-ionic alkoxylated surfactant (MAXEMUL 7101™, Croda Europe Limited). The percentage by weight of each of the trade name products to pigment in each of the dispersions was, respectively, 1%, 3% and 10%. The single pigment dispersions were then blended to provide a dispersion of homogenous colour with a total solids content of 65% (w/w).

The blended dispersion was then spray dried at a feed pressure of 34 bar using a GEA Niro VERSATILE-SD™ size 6.3 spray dryer (GEA. Process Engineering) in a two-point discharge configuration equipped with a pressure nozzle of 0.9 mm diameter and operated at an inlet temperature of 230° C. and outlet temperature of 90° C.

A particulate dry pigment formulation of hollow doughnut morphology with a median particle diameter of 96 μm, particle size distribution of 1.19 and bulk density of 1.02 g/mL was obtained at a rate of 58 Kg/hour (0.56% (w/w) moisture content) with 83% yield.

EXAMPLE 2

Preparation of the Pigment Formulation Designated CT-DPC009

The pigments titanium dioxide (TiO$_2$), yellow iron oxide (pigment code PY 42; yellow iron oxide; CAS#51274-00-1) (Lanxess), pyrrole red (pigment code PR254; bright red; CAS#84632-65-5) (Crenovo International) and chrome oxide green (pigment code PG 17; chrome green; CAS#1308-38-9) (Nubiola) were each prepared as a dispersion (Hegman gauge reading of greater than 7.5 units) in an aqueous solution containing a hydroxylated amine (AMP-95™, Dow Chemical (NZ) Limited), a polycarboxylic acid (RHODOLINE DP 226/40™, Solvay New Zealand Limited) and a non-ionic alkoxylated surfactant (MAXEMUL 7101™, Croda Europe Limited). The percentage by weight of each of the trade name products to pigment in each of the dispersions was, respectively, 1%, 3% and 10%. The single pigment dispersions were then blended to provide a dispersion of homogenous colour with a total solids content of 65% (w/w).

The blended dispersion was then spray dried using a GEA Niro MOBILE MINOR™ spray dryer (GEA Process Engineering) equipped with a rotary atomiser (channel wheel, 11,000 rpm) in a one-point discharge configuration and operated at an inlet temperature of 195° C. and outlet temperature of 110° C.

A particulate dry pigment formulation of hollow doughnut morphology with a median particle diameter of 40 μm was obtained at a rate of 1.9 Kg/hour (1.2% (w/w) moisture content) with 52% yield.

EXAMPLE 3

Preparation of the Pigment Formulation Designated RED (32.101)

The pigments titanium dioxide (TiO$_2$), yellow iron oxide (pigment code PY 42; yellow iron oxide; CAS#51274-00-1) (Lanxess), pyrrole red (pigment code PR254; bright red; CAS#84632-65-5) (Crenovo International), quinacridone red (pigment code PR 122; magenta (pink E); CAS#980-26-7) (Crenovo International), dioxazine violet (pigment code PV 23; deep violet; CAS#6358-30-1) (Crenovo International) and chrome oxide green (pigment code PG 17; chrome green; CAS#1308-38-9) (Nubiola) were each prepared as a dispersion (Hegman gauge reading of greater than 7.5 units) in an aqueous solution containing hydroxylated amine (AMP-95™, Dow Chemical (NZ) Limited), a polycarboxylic acid (RHODOLINE DP 226/40™, Solvay New Zealand Limited) and a non-ionic alkoxylated surfactant (MAXEMUL 7101™, Croda Europe Limited). The percentage by weight of each of the trade name products to pigment in each of the dispersions was, respectively, 1%, 3% and 10%. The single pigment dispersions were then blended to provide a dispersion of homogenous colour with a total solids content of 61.5% (w/w).

The blended dispersion was then spray dried using a GEA Niro MOBILE MINOR™ spray dryer (GEA Process Engineering) equipped with a rotary atomiser (channel wheel, 13,500 rpm) in a one-point discharge configuration and operated at an inlet temperature of 200° C. and outlet temperature of 97° C.

A particulate dry pigment formulation of hollow doughnut morphology with a median particle diameter of 30 μm was obtained at a rate of 1.2 Kg/hour (0.75% (w/w) moisture content) with 45.7% yield.

EXAMPLES 4 to 44

Particulate dry pigment formulations with the pigment composition indicated in Tables 1 to 40 were also prepared adopting the general method described above.

TABLE 1

Composition by weight of pigments (totalling 86.9% (w/w)) included in Example 4 of the particulate dry pigment formulation prepared according to the general method.

| Pigment code | Description | % (w/w) |
| --- | --- | --- |
| PY42 | Iron oxide yellow | 6.1% |
| PG17 | Chrome green oxide | 1.3% |
| PW18 | Chalk | 23.7% |
| PR101 | Iron oxide red | 0.3% |
| Barium sulfate | Barium sulfate | 55.5% |

TABLE 2

Composition by weight of pigments (totalling 84.5% (w/w)) included in Example 5 of the particulate dry pigment formulation prepared according to the general method.

| Pigment code | Description | % (w/w) |
| --- | --- | --- |
| PY154 | Benzimidazolone yellow | 10.7% |
| PR102 | Natural red iron oxide | 10.0% |
| PBr8 | Manganese brown | 1.8% |
| PY42 | Iron oxide yellow | 18.9% |
| PG17 | Chrome green oxide | 1.5% |
| PW6 | Titanium dioxide | 41.6% |

TABLE 3

Composition by weight of pigments (totalling 79.5% (w/w)) included in Example 6 of the particulate dry pigment formulation prepared according to the general method.

| Pigment code | Description | % (w/w) |
|---|---|---|
| PBr8 | Manganese brown | 12.6% |
| PY42 | Iron oxide yellow | 50.3% |
| PG17 | Chrome green oxide | 16.6% |

TABLE 4

Composition by weight of pigments (totalling 86.7% (w/w)) included in Example 7 of the particulate dry pigment formulation prepared according to the general method.

| Pigment code | Description | % (w/w) |
|---|---|---|
| PB29 | Ultramarine blue | 0.3% |
| PG17 | Chrome green oxide | 1.2% |
| PY42 | Iron oxide yellow | 5.2% |
| PR101 | Iron oxide red | 1.3% |
| Barium sulfate | Barium sulfate | 78.7% |

TABLE 5

Composition by weight of pigments (totalling 75.8% (w/w)) included in Example 8 of the particulate dry pigment formulation prepared according to the general method.

| Pigment code | Description | % (w/w) |
|---|---|---|
| PG7 | Phthalocyanine green | 0.4% |
| PR102 | Natural red iron oxide | 11.1% |
| PBk9 | Bone black | 27.1% |
| PY42 | Iron oxide yellow | 37.2% |

TABLE 6

Composition by weight of pigments (totalling 87.2% (w/w)) included in Example 10 of the particulate dry pigment formulation prepared according to the general method.

| Pigment code | Description | % (w/w) |
|---|---|---|
| PW18 | Chalk | 54.8% |
| PY42 | Iron oxide yellow | 2.2% |
| PW6 | Titanium dioxide | 30.2% |

TABLE 7

Composition by weight of pigments (totalling 83.2% (w/w)) included in Example 11 of the particulate dry pigment formulation prepared according to the general method.

| Pigment code | Description | % (w/w) |
|---|---|---|
| PBk9 | Bone black | 9.0% |
| PY42 | Iron oxide yellow | 15.6% |
| PG17 | Chrome green oxide | 1.7% |
| Barium sulfate | Barium sulfate | 56.9% |

TABLE 8

Composition by weight of pigments (totalling 73.0% (w/w)) included in Example 12 of the particulate dry pigment formulation prepared according to the general method.

| Pigment code | Description | % (w/w) |
|---|---|---|
| PBk9 | Bone black | 43.3% |
| PY42 | Iron oxide yellow | 28.6% |
| PR254 | Pyrrole red | 1.1% |

TABLE 9

Composition by weight of pigments (totalling 82.3% (w/w)) included in Example 13 of the particulate dry pigment formulation prepared according to the general method.

| Pigment code | Description | % (w/w) |
|---|---|---|
| PBk9 | Bone black | 19.3% |
| PY43 | Natural yellow iron oxide | 44.2% |
| PR102 | Natural red iron oxide | 8.3% |
| Barium sulfate | Barium sulfate | 10.5% |

TABLE 10

Composition by weight of pigments (totalling 74.3% (w/w)) included in Example 14 of the particulate dry pigment formulation prepared according to the general method.

| Pigment code | Description | % (w/w) |
|---|---|---|
| PBk9 | Bone black | 29.6% |
| PG7 | Phthalocyanine green | 14.0% |
| PR254 | Pyrrole red | 4.2% |
| PY42 | Iron oxide yellow | 26.5% |

TABLE 11

Composition by weight of pigments (totalling 87.2% (w/w)) included in Example 15 of the particulate dry pigment formulation prepared according to the general method.

| Pigment code | Description | % (w/w) |
|---|---|---|
| PY42 | Iron oxide yellow | 3.3% |
| PW18 | Chalk | 20.8% |
| PR101 | Iron oxide red | 1.9% |
| Barium sulfate | Barium sulfate | 61.2% |

TABLE 12

Composition by weight of pigments (totalling 87.3% (w/w)) included in Example 16 of the particulate dry pigment formulation prepared according to the general method.

| Pigment code | Description | % (w/w) |
|---|---|---|
| PY43 | Natural yellow iron oxide | 35.5% |
| Barium sulfate | Barium sulfate | 51.8% |

TABLE 13

Composition by weight of pigments (totalling 84.8% (w/w)) included in Example 17 of the particulate dry pigment formulation prepared according to the general method.

| Pigment code | Description | % (w/w) |
|---|---|---|
| PBr8 | Manganese brown | 21.6% |
| Barium sulfate | Barium sulfate | 63.2% |

TABLE 14

Composition by weight of pigments (totalling 85.5% (w/w)) included in Example 18 of the particulate dry pigment formulation prepared according to the general method.

| Pigment code | Description | % (w/w) |
|---|---|---|
| PBk9 | Bone black | 5.3% |
| PY43 | Natural yellow iron oxide | 1.2% |
| PY42 | Iron oxide yellow | 4.9% |
| PR101 | Iron oxide red | 3.0% |
| Barium sulfate | Barium sulfate | 71.1% |

TABLE 15

Composition by weight of pigments (totalling 75.5% (w/w)) included in Example 19 of the particulate dry pigment formulation prepared according to the general method.

| Pigment code | Description | % (w/w) |
|---|---|---|
| PBk9 | Bone black | 24.4% |
| PR254 | Pyrrole red | 4.8% |
| PG7 | Phthalocyanine green | 1.5% |
| PY42 | Iron oxide yellow | 44.8% |

TABLE 16

Composition by weight of pigments (totalling 89.1% (w/w)) included in Example 20 of the particulate dry pigment formulation prepared according to the general method.

| Pigment code | Description | % (w/w) |
|---|---|---|
| PBk9 | Manganese brown | 0.4% |
| PR254 | Natural iron oxide yellow | 1.2% |
| PG7 | Ultramarine blue | 0.3% |
| PY42 | Yellow iron oxide | 0.9% |
| Barium sulfate | Barium sulfate | 86.3% |

TABLE 17

Composition by weight of pigments (totalling 87.1% (w/w)) included in Example 21 of the particulate dry pigment formulation prepared according to the general method.

| Pigment code | Description | % (w/w) |
|---|---|---|
| PY42 | Iron oxide yellow | 3.5% |
| PG17 | Chrome green oxide | 7.5% |
| PR101 | Iron oxide red | 3.8% |
| Barium sulfate | Barium sulfate | 72.3% |

TABLE 18

Composition by weight of pigments (totalling 75.6% (w/w)) included in Example 22 of the particulate dry pigment formulation prepared according to the general method.

| Pigment code | Description | % (w/w) |
|---|---|---|
| PG7 | Phthalocyanine green | 1.0% |
| PBk9 | Bone black | 22.8% |
| PY42 | Iron oxide yellow | 48.1% |
| PR101 | Iron oxide red | 3.7% |

TABLE 19

Composition by weight of pigments (totalling 86.4% (w/w)) included in Example 23 of the particulate dry pigment formulation prepared according to the general method.

| Pigment code | Description | % (w/w) |
|---|---|---|
| PY42 | Iron oxide yellow | 9.0% |
| PG17 | Chrome green oxide | 16.7% |
| PR101 | Iron oxide red | 2.5% |
| Barium sulfate | Barium sulfate | 58.2% |

TABLE 20

Composition by weight of pigments (totalling 75.8% (w/w)) included in Example 24 of the particulate dry pigment formulation prepared according to the general method.

| Pigment code | Description | % (w/w) |
|---|---|---|
| PG7 | Phthalocyanine green | 2.1% |
| PBk9 | Bone black | 27.1% |
| PY42 | Iron oxide yellow | 36.0% |
| PR101 | Iron oxide red | 10.6% |

TABLE 21

Composition by weight of pigments (totalling 86.5% (w/w)) included in Example 25 of the particulate dry pigment formulation prepared according to the general method.

| Pigment code | Description | % (w/w) |
|---|---|---|
| PBk9 | Bone black | 3.9% |
| PY43 | Natural yellow iron oxide | 4.2% |
| Barium sulfate | Barium sulfate | 78.4% |

TABLE 22

Composition by weight of pigments (totalling 80.3% (w/w)) included in Example 26 of the particulate dry pigment formulation prepared according to the general method.

| Pigment code | Description | % (w/w) |
|---|---|---|
| PB15.3 | Phthalocyanine blue | 0.9% |
| PBk9 | Bone black | 19.3% |
| PR101 | Iron oxide red | 2.2% |
| PY42 | Iron oxide yellow | 17.3% |
| Barium sulfate | Barium sulfate | 40.6% |

TABLE 23

Composition by weight of pigments (totalling 73.3% (w/w)) included in Example 27 of the particulate dry pigment formulation prepared according to the general method.

| Pigment code | Description | % (w/w) |
| --- | --- | --- |
| PG7 | Phthalocyanine green | 1.4% |
| PR254 | Pyrrole red | 0.7% |
| PBk9 | Bone black | 43.7% |
| PB15.3 | Phthalocyanine blue | 0.5% |
| PY42 | Iron oxide yellow | 20.9% |
| PR101 | Iron oxide red | 6.1% |

TABLE 24

Composition by weight of pigments (totalling 87.5% (w/w)) included in Example 29 of the particulate dry pigment formulation prepared according to the general method.

| Pigment code | Description | % (w/w) |
| --- | --- | --- |
| PY42 | Iron oxide yellow | 0.5% |
| PW18 | Chalk | 47.5% |
| PW6 | Titanium dioxide | 22.8% |
| Barium sulfate | Barium sulfate | 16.7% |

TABLE 25

Composition by weight of pigments (totalling 86.9% (w/w)) included in Example 29 of the particulate dry pigment formulation prepared according to the general method.

| Pigment code | Description | % (w/w) |
| --- | --- | --- |
| PBk9 | Bone black | 1.9% |
| PB15.3 | Phthalocyanine blue | 0.1% |
| PY42 | Iron oxide yellow | 1.2% |
| Barium sulfate | Barium sulfate | 83.7% |

TABLE 26

Composition by weight of pigments (totalling 86.9% (w/w)) included in Example 30 of the particulate dry pigment formulation prepared according to the general method.

| Pigment code | Description | % (w/w) |
| --- | --- | --- |
| PB15.3 | Phthalocyanine blue | 4.3% |
| PY154 | Benzimidazolone yellow | 11.8% |
| PR254 | Pyrrole red | 4.3% |
| Barium sulfate | Barium sulfate | 66.5% |

TABLE 27

Composition by weight of pigments (totalling 83.3% (w/w)) included in Example 31 of the particulate dry pigment formulation prepared according to the general method.

| Pigment code | Description | % (w/w) |
| --- | --- | --- |
| PB15.3 | Phthalocyanine blue | 8.8% |
| PR254 | Pyrrole red | 6.3% |
| PR101 | Iron oxide red | 45.6% |
| PY42 | Iron oxide yellow | 22.6% |

TABLE 28

Composition by weight of pigments (totalling 86.3% (w/w)) included in Example 32 of the particulate dry pigment formulation prepared according to the general method.

| Pigment code | Description | % (w/w) |
| --- | --- | --- |
| PBk9 | Bone black | 4.9% |
| PY43 | Natural yellow iron oxide | 8.5% |
| Barium sulfate | Barium sulfate | 72.9% |

TABLE 29

Composition by weight of pigments (totalling 84.7% (w/w)) included in Example 33 of the particulate dry pigment formulation prepared according to the general method.

| Pigment code | Description | % (w/w) |
| --- | --- | --- |
| PY43 | Natural yellow iron oxide | 21.1% |
| PB29 | Ultramarine blue | 14.9% |
| Barium sulfate | Barium sulfate | 48.7% |

TABLE 30

Composition by weight of pigments (totalling 73.7% (w/w)) included in Example 34 of the particulate dry pigment formulation prepared according to the general method.

| Pigment code | Description | % (w/w) |
| --- | --- | --- |
| PBk9 | Bone black | 52.4% |
| Barium sulfate | Barium sulfate | 21.3% |

TABLE 31

Composition by weight of pigments (totalling 83.1% (w/w)) included in Example 35 of the particulate dry pigment formulation prepared according to the general method.

| Pigment code | Description | % (w/w) |
| --- | --- | --- |
| PBk9 | Bone black | 14.4% |
| PR102 | Natural red iron oxide | 5.1% |
| PY42 | Iron oxide yellow | 5.4% |
| PG17 | Chrome green oxide | 4.6% |
| Barium sulfate | Barium sulfate | 53.6% |

TABLE 32

Composition by weight of pigments (totalling 76.1% (w/w)) included in Example 36 of the particulate dry pigment formulation prepared according to the general method.

| Pigment code | Description | % (w/w) |
| --- | --- | --- |
| PBk9 | Bone black | 37.2% |
| PR102 | Natural red iron oxide | 13.1% |
| PY42 | Iron oxide yellow | 13.9% |
| PG17 | Chrome green oxide | 11.9% |

TABLE 33

Composition by weight of pigments (totalling 86.9% (w/w)) included in Example 37 of the particulate dry pigment formulation prepared according to the general method.

| Pigment code | Description | % (w/w) |
|---|---|---|
| PBk9 | Bone black | 3.9% |
| PW18 | Chalk | 54.6% |
| Barium sulfate | Barium sulfate | 28.4% |

TABLE 34

Composition by weight of pigments (totalling 83.0% (w/w)) included in Example 38 of the particulate dry pigment formulation prepared according to the general method.

| Pigment code | Description | % (w/w) |
|---|---|---|
| PBk9 | Bone black | 15.5% |
| PY42 | Iron oxide yellow | 4.9% |
| PR101 | Iron oxide red | 0.4% |
| Barium sulfate | Barium sulfate | 62.2% |

TABLE 35

Composition by weight of pigments (totalling 82.8% (w/w)) included in Example 39 of the particulate dry pigment formulation prepared according to the general method.

| Pigment code | Description | % (w/w) |
|---|---|---|
| PBk9 | Bone black | 16.4% |
| PG7 | Phthalocyanine green | 1.0% |
| PR254 | Pyrrole red | 1.8% |
| PY43 | Natural yellow iron oxide | 63.6% |

TABLE 36

Composition by weight of pigments (totalling 85.7% (w/w)) included in Example 40 of the particulate dry pigment formulation prepared according to the general method.

| Pigment code | Description | % (w/w) |
|---|---|---|
| PG7 | Phthalocyanine green | 4.2% |
| PY154 | Benzimidazolone yellow | 7.9% |
| PY139 | Isoindoline yellow | 1.9% |
| PY42 | Iron oxide yellow | 3.7% |
| PR101 | Iron oxide red | 16.1% |
| PW6 | Titanium dioxide | 51.9% |

TABLE 37

Composition by weight of pigments (totalling 84.2% (w/w)) included in Example 41 of the particulate dry pigment formulation prepared according to the general method.

| Pigment code | Description | % (w/w) |
|---|---|---|
| PG7 | Phthalocyanine green | 5.9% |
| PV23 | Dioxazine violet | 1.5% |
| PR254 | Pyrrole red | 1.0% |
| PY154 | Benzimidazolone yellow | 3.0% |
| PY42 | Iron oxide yellow | 12.7% |
| PW6 | Titanium dioxide | 56.5% |
| PR101 | Iron oxide red | 3.6% |

TABLE 38

Composition by weight of pigments (totalling 84.5% (w/w)) included in Example 42 of the particulate dry pigment formulation prepared according to the general method.

| Pigment code | Description | % (w/w) |
|---|---|---|
| PB15.3 | Phthalocyanine blue | 12.4% |
| PG7 | Phthalocyanine green | 5.4% |
| PR254 | Pyrrole red | 3.5% |
| PR101 | Iron oxide red | 32.1% |
| PW6 | Titanium dioxide | 31.1% |

TABLE 39

Composition by weight of pigments (totalling 84.4% (w/w)) included in Example 43 of the particulate dry pigment formulation prepared according to the general method.

| Pigment code | Description | % (w/w) |
|---|---|---|
| PR254 | Pyrrole red | 8.5% |
| PG7 | Phthalocyanine green | 0.4% |
| PR102 | Natural red iron oxide | 17.2% |
| PY139 | Isoindoline yellow | 1.8% |
| PR101 | Iron oxide red | 9.6% |
| PY42 | Iron oxide yellow | 20.6% |
| PW6 | Titanium dioxide | 26.3% |

TABLE 40

Composition by weight of pigments (totalling 82.4% (w/w)) included in Example 44 of the particulate dry pigment formulation prepared according to the general method.

| Pigment code | Description | % (w/w) |
|---|---|---|
| PR254 | Pyrrole red | 48.3% |
| PB15.3 | Phthalocyanine blue | 1.5% |
| PR122 | Quinacridone red | 13.3% |
| PG7 | Phthalocyanine green | 0.8% |
| PY154 | Benzimidazolone yellow | 3.2% |
| PR101 | Iron oxide red | 8.2% |
| PW6 | Titanium dioxide | 7.1% |

Performance of Pigment Formulations

The relative tint strengths of a matt acrylic base paint (STOCOLOR OPTICRYL™ matt, Sto AG, StÜhlingen) coloured with 10% (w/w) of the formulation designated CT-DPC-T106 before spray drying ('WET') and after spray drying ('DRY') were determined. The relative tint strengths of a matt acrylic base paint (STOCOLOR OPTICRYL™ matt, Sto AG, Stühlingen) coloured with 10% (w/w) of a formulation of the pigment yellow iron oxide (pigment code PY 42; yellow iron oxide; CAS#51274-00-1) (Lanxess) before spray drying ('WET') and after spray drying ('DRY') were also determined. Both formulations were prepared according to the same general method and relative tint strengths determined by instrumental evaluation (Anon (2007)). The determinations are provided in Tables 41, 42 and 43.

TABLE 41

The relative tint strengths of a matt acrylic base paint (STOCOLOR OPTICRYL ™ matt, Sto AG, Stuhlingen) coloured with 10% (w/w) of the formulation designated CT-DPC-T106 before spray drying ('WET') and after spray drying ('DRY') as determined by instrumental evaluation at 500 nm (Anon (2007)).

| WET | | | DRY | | |
|---|---|---|---|---|---|
| Standard | Relative | Relative tint strength | Standard | Relative | Relative tint strength |
| 0.4116 | 0.4116 | 100.0% | 0.4116 | 0.4140 | 98.6% |
| 0.4116 | 0.4138 | 98.7% | 0.4116 | 0.4118 | 99.9% |
| 0.4116 | 0.4139 | 98.7% | 0.4116 | 0.4123 | 99.6% |
| 0.4116 | 0.4130 | 99.2% | 0.4116 | 0.4129 | 99.2% |
| 0.4116 | 0.4133 | 99.0% | 0.4116 | 0.4123 | 99.6% |
| 0.4116 | 0.4125 | 99.5% | 0.4116 | 0.4122 | 99.7% |
| 0.4116 | 0.4124 | 99.5% | 0.4116 | 0.4134 | 99.0% |
| | | | 0.4116 | 0.4129 | 99.2% |

TABLE 42

The relative tint strengths of a matt acrylic base paint (STOCOLOR OPTICRYL ™ matt, Sto AG, Stühlingen) coloured with 10% (w/w) of a formulation of the pigment yellow iron oxide (pigment code PY 42; yellow iron oxide; CAS# 51274-00-1) (Lanxess) before spray drying ('WET') and after spray drying ('DRY') as determined by instrumental evaluation at 500 nm (Anon (2007)). Relative tint strengths provided by use of the unformulated pigment determined at the same wavelength by the same method are also provided ('RAW').

| | standard | WET | DRY | RAW | WET | DRY | RAW |
|---|---|---|---|---|---|---|---|
| 1 | 22.81 | 22.81 | 22.42 | 28.38 | 100% | 98% | 79% |
| 1b | 22.81 | 22.76 | 22.45 | 28.39 | 100% | 98% | 79% |
| 2 | 22.81 | 22.62 | 22.49 | 28.71 | 99% | 99% | 78% |
| 2b | 22.81 | 22.56 | 22.56 | 28.69 | 99% | 99% | 78% |
| 3 | 22.81 | 22.62 | 22.52 | 29.55 | 99% | 99% | 76% |
| 3b | 22.81 | 22.57 | 22.48 | 28.88 | 99% | 98% | 77% |
| 4 | 22.81 | 22.70 | 22.63 | 32.94 | 100% | 99% | 67% |
| 4b | 22.81 | 22.67 | 22.66 | | 99% | 99% | |
| 5 | 22.81 | 22.61 | | | 99% | | |
| 5b | 22.81 | 22.57 | | | 99% | | |

TABLE 43

The relative tint strengths of a matt acrylic base paint (STOCOLOR OPTICRYL ™ matt, Sto AG, Stühlingen) coloured with 10% (w/w) of a formulation of the pigment yellow iron oxide (pigment code PY 42; yellow iron oxide; CAS# 51274-00-1) (Lanxess) before spray drying ('WET') and after spray drying ('DRY') as determined by instrumental evaluation at 420 nm (Anon (2007)). Relative tint strengths provided by use of the unformulated pigment determined at the same wavelength by the same method are also provided ('RAW').

| | standard | WET | DRY | RAW | WET | DRY | RAW |
|---|---|---|---|---|---|---|---|
| 1 | 12.82 | 12.91 | 12.56 | 17.17 | 101% | 98% | 72% |
| 1b | 12.82 | 12.82 | 12.63 | 17.13 | 100% | 98% | 72% |
| 2 | 12.82 | 12.77 | 12.68 | 17.48 | 100% | 99% | 70% |
| 2b | 12.82 | 12.72 | 12.67 | 16.20 | 99% | 99% | 76% |
| 3 | 12.82 | 12.80 | 12.60 | 18.15 | 100% | 98% | 67% |
| 3b | 12.82 | 12.75 | 12.62 | 17.58 | 99% | 98% | 70% |
| 4 | 12.82 | 12.79 | 12.74 | 21.82 | 100% | 99% | 55% |
| 4b | 12.82 | 12.86 | 12.75 | | 100% | 99% | |
| 5 | 12.82 | 12.75 | | | 99% | | |
| 5b | 12.82 | 12.76 | | | 99% | | |

No significant difference was observed between the tint strength of wet and dried formulations indicating that the uniform dispersibility of the pigment(s) is maintained through the spray drying process.

COMPARATIVE EXAMPLES

The performance of the particulate dry pigment formulations prepared according to the general method was compared with that of commercially available XFAST™ pigment formulations (BASF). Single pigment particulate dry pigment formulations comprising either the pigment titanium dioxide ($TiO_2$) or the pigment copper phthalocyanine (FASTOGEN™ blue CA5380) were prepared according to the general method. A comparison of the physical characteristics of the two particulate dry pigment formulations prepared by the general method and two commercially available single pigment formulations is presented in Table 44.

TABLE 44

Comparison of the physical characteristics of particulate dry pigment formulations of the invention ('White' and 'Blue') and commercially available XFAST ™ formulations (BASF). The mean particle size was estimated by microscopy.

| | White | Blue | XFAST ™ white 0025 (BASF) | XFAST ™ blue 7080 (BASF) |
|---|---|---|---|---|
| Pigment composition | Titanium dioxide | Copper phthalocyanine | Titanium dioxide | Copper phthalocyanine |
| Mean particle size (μm) | 30 | 35 | 330 | 240 |
| Bulk density (g/mL) | 1.15 | 0.75 | 0.9 | 0.6 |
| Particulate morphology | Spherical hollow donut | Spherical hollow donut | Spherical hollow donut | Spherical hollow donut |

A blend of the single pigment formulations was used to colour a matt acrylic base paint (STOCOLOR OPTICRYL™ matt, Sto AG, Stühlingen) and the colour deviation of replicate blends for the two pigment systems compared (Table 45 and Table 46). A formulation comprising a combination of pigments was also used to colour the matt acrylic base paint (STOCOLOR OPTICRYL™ matt, Sto AG, Stühlingen) and the colour deviation of replicate blends compared (Table 47).

TABLE 45

Colour spectrum analysis of a matt acrylic base paint (STOCOLOR OPTICRYL ™ matt, Sto AG, Stühlingen) coloured with a blend of single pigment formulations prepared according to the invention.

| | L | a | b | C | H | Colour deviation |
|---|---|---|---|---|---|---|
| 1A | −0.04 | −0.02 | −0.02 | 0.02 | 0.00 | 0.05 |
| 1B | −0.03 | −0.02 | 0.00 | 0.01 | −0.02 | 0.05 |
| 2A | −0.14 | 0.03 | 0.04 | −0.05 | 0.01 | 0.15 |
| 2B | −0.12 | −0.02 | 0.01 | 0.00 | −0.02 | 0.14 |
| 3A | −0.23 | 0.01 | −0.06 | 0.05 | 0.04 | 0.23 |
| 3B | −0.25 | 0.07 | −0.05 | 0.01 | 0.08 | 0.27 |
| 4A | −0.17 | 0.02 | −0.01 | −0.01 | 0.02 | 0.18 |
| 4B | −0.14 | 0.02 | 0.00 | −0.01 | 0.02 | 0.14 |
| 5A | −0.05 | −0.11 | −0.07 | 0.12 | −0.06 | 0.17 |
| 5B | −0.10 | −0.02 | −0.02 | 0.04 | 0.00 | 0.12 |
| Average | 0.13 | 0.00 | −0.02 | 0.02 | 0.01 | 0.15 |
| SD | 0.07 | 0.05 | 0.03 | 0.04 | 0.04 | 0.07 |

TABLE 46

Colour spectrum analysis of a matt acrylic base paint (STOCOLOR OPTICRYL™ matt, Sto AG, Stühlingen) coloured with a blend of XFAST™ single pigment formulations.

|         | L     | a     | b     | C     | H     | Colour deviation |
|---------|-------|-------|-------|-------|-------|------------------|
| BASF-1A | −2.20 | 0.92  | −0.40 | 0.30  | 1.19  | 2.56             |
| BASF-1B | −2.35 | 1.03  | −0.45 | −0.07 | 1.13  | 2.61             |
| BASF-2A | −0.52 | 0.17  | −0.14 | 0.04  | 0.21  | 0.57             |
| BASF-2B | −0.49 | 0.27  | −0.07 | −0.06 | 0.27  | 0.58             |
| BASF-3A | −0.45 | 0.20  | −0.10 | −0.01 | 0.23  | 0.52             |
| BASF-3B | −0.44 | 0.17  | −0.11 | 0.02  | 0.20  | 0.49             |
| BASF-4A | −2.14 | 0.90  | −0.51 | 0.04  | 1.03  | 2.38             |
| BASF-4B | −2.18 | 0.90  | −0.51 | 0.04  | 1.03  | 2.42             |
| BASF-5A | 0.05  | −0.02 | 0.00  | 0.00  | −0.01 | 0.07             |
| BASF-5B | −0.11 | 0.04  | 0.02  | −0.03 | 0.03  | 0.13             |
| Average | −1.08 | 0.46  | −0.23 | 0.03  | 0.53  | 1.23             |
| SD      | 0.94  | 0.40  | 0.20  | 0.10  | 0.47  | 1.04             |

TABLE 47

Colour spectrum analysis of a matt acrylic base paint (STOCOLOR OPTICRYL™ matt, Sto AG, Stühlingen) coloured with a "whole colour" formulation prepared according to the invention.

|         | L     | a     | b     | C     | H     | Colour deviation |
|---------|-------|-------|-------|-------|-------|------------------|
| T106-1A | −0.01 | 0.03  | −0.01 | 0.01  | −0.03 | 0.05             |
| T106-1B | 0.02  | 0.04  | 0.02  | 0.03  | −0.02 | 0.05             |
| T106-2A | 0.04  | −0.03 | 0.02  | −0.01 | 0.04  | 0.05             |
| T106-2B | 0.03  | −0.04 | 0.02  | −0.01 | 0.05  | 0.06             |
| T106-3A | 0.00  | 0.04  | 0.01  | 0.04  | −0.02 | 0.05             |
| T106-3B | 0.02  | 0.02  | 0.05  | 0.07  | 0.02  | 0.07             |
| T106-4A | 0.05  | 0.00  | −0.01 | −0.01 | −0.01 | 0.06             |
| T106-4B | 0.06  | 0.04  | −0.02 | 0.00  | −0.04 | 0.08             |
| Average | 0.03  | 0.01  | 0.01  | 0.02  | 0.00  | 0.06             |
| SD      | 0.024 | 0.029 | 0.022 | 0.026 | 0.029 | 0.011            |

The colour deviation determined for colouring with a blend of single pigment formulations or a formulation of a combination of pigments prepared according to the invention is less than that determined for colouring with a blend of the commercially available XFAST™ single pigment formulations.

Alternative formulants were evaluated for use in the formulation of pigment preparations. The formulants evaluated for use included those supplied under the following trade names: TIGO DISPERS 656™, TIGO DISPERS 653™, TIGO DISPERS 610™, TIGO DISPERS 685™, TIGO DISPERS 651™, TIGO DISPERS 652™, TIGO DISPERS 750W™, TIGO DISPERS 735W™, TIGO DISPERS 715W™, POLYSPERSE 7™ (Nuplex), DISPER BYK 022™, DISPER BYK 190™, DISPER BYK 199™, DISPER BYK 2015™, DISPER BYK 2012™, DISPER BYK 2010™, LDA 100™ (Lorama Group), ZEPHRYM PD 3315™, ZEPHRYM PD 4913™, ZEPHRYM 3300B™, ZEPHRYM PD 7000™ and the formulants ethylenediamine tetrakis (ethoxylate-block-propoxylate)tetrol or ethylenediamine tetrakis (propoxylate-block-ethoxylate) tetrol. The formulae of examples of formulations comprising one or more of these alternative formulants and inorganic or organic pigments are provided in Tables 48 to 52.

TABLE 48

Composition by weight (the balance being water) of the formulation of Comparative Example 1.

| Ingredient      | Description      | % (w/w) |
|-----------------|------------------|---------|
| PBk11           | Iron oxide black | 68.2    |
| TEGO DISPERS 656|                  | 4.6     |
| TEGO DISPERS 652|                  | 0.6     |

TABLE 49

Composition by weight (the balance being water) of the formulation of Comparative Example 2.

| Ingredient    | Description     | % (w/w) |
|---------------|-----------------|---------|
| PB29          | Ultramarine blue| 44.2    |
| DISPER BYK 190|                 | 20.4    |

TABLE 50

Composition by weight (the balance being water) of the formulation of Comparative Example 3.

| Ingredient    | Description       | % (w/w) |
|---------------|-------------------|---------|
| PV16          | manganese violet  | 43.1    |
| AEROSIL 200   |                   | 108     |
| DISPER BYK 199|                   | 12.9    |
| PEG 400       |                   | 7.8     |

TABLE 51

Composition by weight (the balance being water) of the formulation of Comparative Example 4.

| Ingredient    | Description     | % (w/w) |
|---------------|-----------------|---------|
| PB29          | Ultramarine blue| 34.9    |
| DISPER BYK 199|                 | 18.1    |
| ACROPOL       |                 | 20.3    |

TABLE 52

Composition by weight (the balance being water) of the formulation of Comparative Example 5.

| Ingredient      | Description    | % (w/w) |
|-----------------|----------------|---------|
| PR101           | Iron oxide red | 63.6    |
| AEROSIL 200     |                | 1.2     |
| TEGO DISPERS 656|                | 5.5     |
| TEGO DISPEPS 652|                | 0.6     |
| PEG 400         |                | 0.2     |
| FORMEX 825      |                | 0.2     |

Aqueous dispersions of the formulations provided in Tables 48 to 52 were initially prepared using a high speed disperser. Each of these aqueous dispersions effectively tinted an acrylic paint base medium. However, the performance of the formulations deteriorated following spray drying. Each of the aqueous dispersions was spray dried using a bench top spray dryer (Buchi 290). Drying conditions were required to be optimised for each formulation.

It was observed that the primary particles of pigment of some of the spray dried formulations (Comparative Examples 1 to 4) no longer adequately dispersed when the spray dried formulation was added to the acrylic paint base medium. All these formulations displayed moderate to severe flooding when added to this base medium. The initial performance of a spray dried formulation (Comparative Example 5) was satisfactory, but after a 10 day period of storage the performance of this formulation deteriorated and displayed increasing flooding when added to the base medium.

Although the invention has been described with reference to embodiments or examples it should be appreciated that variations and modifications may be made to these embodiments or examples without departing from the scope of the invention. Where known equivalents exist to specific elements, features or integers, such equivalents are incorporated as if specifically referred to in this specification. In particular, variations and modifications to the embodiments or examples that include elements, features or integers disclosed in and selected from the referenced publications are within the scope of the invention unless specifically disclaimed. The advantages provided by the invention and discussed in the description may be provided in the alternative or in combination in these different embodiments of the invention.

Preferred embodiments of methods and compositions of the present invention are described above with reference to preparation of paints and other coatings using solvent-based or aqueous-based base solutions. It will be appreciated, however, that these methods may be used to formulate dry pigment preparations for use with other types of liquid base materials, such a various types of coatings, varnishes, lacquers, stains, and the like, as well as inks, automotive paints and coatings, and other types of industrial paints and coatings.

It will also be appreciated that, while methods and packaged dry pigment mixtures of the present invention have been described primarily for use in connection with liquid base solutions such as various types of coatings and paints, the packaged dry pigment mixtures of the present invention may be used and mixed to confer desired colour properties to base materials having a dry particulate or a "wet" composition. Methods and compositions of the present invention may be applied, for example, to materials such as plasters, clays, grouts and the like, that are often packaged as dry materials and made-up by mixing a liquid solution. Methods and compositions of the present invention may also be applied, for example, for use with other types of particulate building materials, with slurries, and with materials that are "wet" such as mixed plasters, clays, concretes, caulking and the like.

While the present invention has been illustrated by the description of the embodiments thereof, and while the embodiments have been described in detail, it is not the intention to restrict or in any way limit the scope of the appended claims to such detail. Further, the above embodiments may be implemented individually, or may be combined where compatible. Additional advantages and modifications, including combinations of the above embodiments, will readily appear to those skilled in the art. Therefore, the invention in its broader aspects is not limited to the specific details, representative apparatus and methods, and illustrative examples shown and described. Accordingly, departures may be made from such details without departure from the spirit or scope of the general inventive concept.

REFERENCED PUBLICATIONS

Anon (2007) *Standard test methods for relative tinting strength of paste-type printing ink dispersions* (D2006-07) ASTM International, 100 Bar Harbor Drive, PO Box C 700, West Conshohocken, Pa. 19423-2959, United States.

Anon (2010) *Standard test method for fineness of dispersion of pigment-vehicle systems by Hegman-type gage* (D1210-05) ASTM International, 100 Bar Harbor Drive, PO Box C 700, West Conshohocken, Pa. 19428-2959, United States.

Aoba et al (2001) *Composite pigments, colouring compositions, and image recording substances* European Patent application no. 00114914.5 [publ. no. EP 1070747 A2].

Kruithof et al (2010) Pigment preparation U.S. Pat. No. 7,846,997.

Lacy et al (2014) *Dry colour systems and methods* International application no. PCT/NZ2014/000026 [publ. no. WO 2017/137226 A2].

McKay (1973) *Process for the production of flocculation resistant pigments* U.S. Pat. No. 3,770,476.

Ortalano et al (2008) *Stir-in form of pigment* U.S. Pat. No. 7,459,017.

Ranee et al (2007) *Encapsulated colorants for waterborne coating compositions system kit and method* International application no. PCT/US2007/066066 [publ. no. WO 2007/115335 A2].

Reisacher and Gomez (2007) *Pigment granules* U.S. Pat. No. 7,198,668.

Reisacher et al (2008) *Solid pigment preparations containing water-soluble surface-active additives and anti-oxidants* U.S. patent application Ser. No. 11/995,129 (publ. no. 2008/0190319 A1).

Roy et al (2010) *Pigment preparation* U.S. Pat. No. 7,842,757.

Tauber et al (2010) *Pigment preparation, method for producing the same and its use* U.S. patent application Ser. No. 12/602,959 [publ. no. US 2010/0180794 A1].

Thompson et al (2009) *Novel crystal forms of quinacridones made from 2,9-dimethyoxyquinacridone and 2,9-dichloroquinacridone* International application no. PCT/US2009/041698 [publ. no. WO 2009/132293 A1].

Wenning and Loest (2010) *Compositions for producing universal pigment preparations* U.S. Pat. No. 7,834,098.

Wilkinson (1966) *Solid solutions* U.S. Pat. No. 3,259,514.

The invention claimed is:

1. A dry pigment formulation dose form consisting essentially of two or more walls defining an interior volume and an amount of a dry pigment formulation contained in the interior volume where the dry pigment formulation is a spray dried particulate dry pigment formulation consisting essentially of one or more pigments and 0.5 to 3.6% (w/w) hydroxylated amine, 0.56 to 4.52% (w/w) acrylic acid polymer and 4.5 to 37.7% (w/w) ethylene oxide-propylene oxide diblock copolymer.

2. The dry pigment dose form as claimed in claim 1 where one of the two or more walls forms a recess and another of the walls forms a seal across the opening of the recess to form the interior volume.

3. The dry pigment dose form as claimed in claim 2 where the one of the two or more walls is formed from a polymer film having a first thickness and the another of the walls has a second thickness less than the first thickness.

4. The dry pigment dose form as claimed in claim 3 where the one of the two or more walls is soluble in a paint base over a first time period and the another of the walls is soluble in the paint base over a second time period less than the first time period.

5. The dry pigment dose form as claimed in claim 4 where the formulation consists essentially of one or more pigments and 0.5 to 2.3% (w/w) hydroxylated amine, 0.8 to 2.8% (w/w) acrylic acid polymer and 7.5 to 19% (w/w) ethylene oxide-propylene oxide diblock copolymer.

* * * * *